United States Patent
Tsunoda et al.

(10) Patent No.: US 7,062,618 B2
(45) Date of Patent: Jun. 13, 2006

(54) TRANSFERRING DATA BETWEEN VOLATILE AND NON-VOLATILE MEMORIES BASED ON SYSTEM PARAMETERS USING A CONTROLLER

(75) Inventors: Motoyasu Tsunoda, Sagamihara (JP); Shinya Iguchi, Fujisawa (JP); Junichi Maruyama, Yokohama (JP); Kazuo Nakamura, Fussa (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 10/172,096

(22) Filed: Jun. 13, 2002

(65) Prior Publication Data

US 2003/0028733 A1 Feb. 6, 2003

(30) Foreign Application Priority Data

| Jun. 13, 2001 | (JP) | ............................ 2001-177924 |
| Jul. 13, 2001 | (JP) | ............................ 2001-213639 |
| Jul. 13, 2001 | (JP) | ............................ 2001-213640 |

(51) Int. Cl.
*G06F 12/00* (2006.01)

(52) U.S. Cl. .......................................... 711/154; 714/6
(58) Field of Classification Search ................ 365/228; 711/152, 154, 156, 103, 170, 202; 714/6
See application file for complete search history.

(56) References Cited

U.S. PATENT DOCUMENTS

| 5,515,333 | A | * | 5/1996 | Fujita et al. ................. 365/229 |
| 5,581,723 | A | * | 12/1996 | Hasbun et al. ............... 711/103 |
| 5,630,093 | A | | 5/1997 | Holzhammer et al. |
| 5,644,539 | A | | 7/1997 | Yamagami et al. |
| 5,936,971 | A | | 8/1999 | Harari et al. |
| 6,301,635 | B1 | * | 10/2001 | Bothwell et al. ........... 711/103 |
| 6,347,051 | B1 | * | 2/2002 | Yamagami et al. .... 365/185.09 |
| 6,366,977 | B1 | | 4/2002 | Mizoguchi |
| 6,415,350 | B1 | * | 7/2002 | Asoh .......................... 711/103 |
| 2002/0147882 | A1 | * | 10/2002 | Pua et al. .................... 711/103 |

FOREIGN PATENT DOCUMENTS

| JP | 2001-5723 | 1/2001 |
| KR | 1999-019377 | 3/1999 |

* cited by examiner

Primary Examiner—Christian P. Chace
(74) Attorney, Agent, or Firm—Townsend and Townsend and Crew LLP

(57) ABSTRACT

A memory apparatus having a volatile memory for storing data from a host, a nonvolatile memory capable of storing the data stored in the volatile memory, and electrically deleting the data, and a control circuit for controlling data transfer between the volatile memory and the nonvolatile memory. A capacity of a data storage area of the volatile memory is larger than that of a data storage area of the nonvolatile memory.

9 Claims, 26 Drawing Sheets

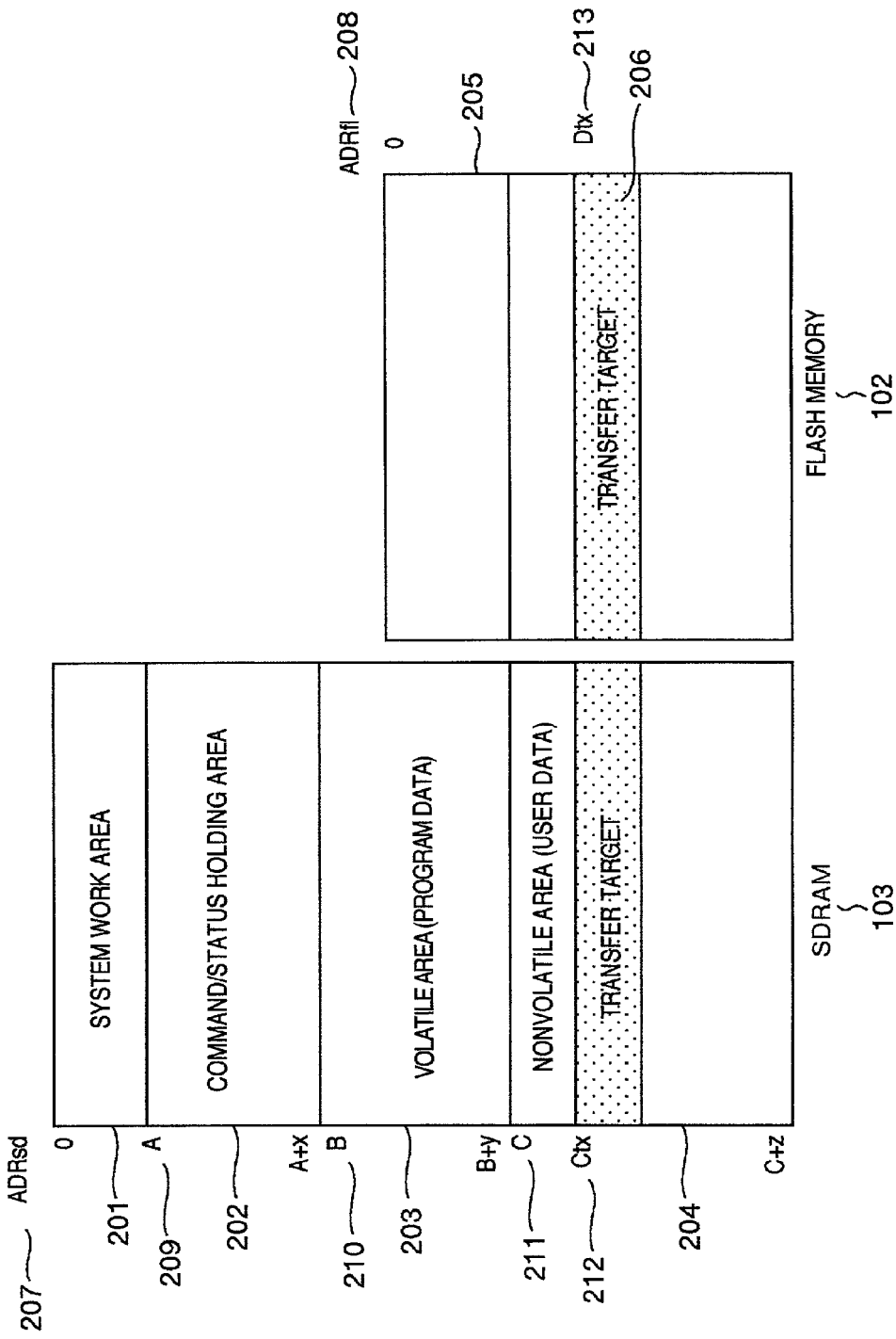

FIG.3

| Offset Address | CONTENT |
|---|---|
| 0 | DESIGNATION OF HEAD ADDRESS (ADRsdB) OF VOLATILE AREA ~302 |
| 1 | DESIGNATION OF VOLATILE AREA SIZE (y) ~303 |
| 2 | DESIGNATION OF HEAD ADDRESS (ADRsdC) OF NONVOLATILE AREA ~304 |
| 3 | DESIGNATION OF NONVOLATILE AREA SIZE (z) ~305 |
| 4 | INSTRUCTION OF FLASH FORMAT ~306 |
| 5 | DESIGNATION OF FLASH TRANSFER (OR ERASURE) START LOGICAL SECTOR ADDRESS (Dtx) ~307 |
| 6 | DESIGNATION OF SDRAM TRANSFER START ADDRESS (Ctx) ~308 |
| 7 | DESIGNATION OF FLASH-SDRAM TRANSFER SIZE (OR FLASH DATA ERASURE SIZE) ~309 |
| 8 | STARTING OF FLASH-SDRAM TRANSFER ~310 |
| 9 | POWER SAVING MODE (POWER IS TURNED OFF FOR FLASH TRASNFER SYSTEM CIRCUIT) ~311 |
| 10 | INSTRUCTION OF FLASH DATA ERASURE ~312 |
| ~n | SPARE ~313 |
| n+1 | STATUS/ERROR INFORMATION ~314 |
| ~m | SPARE ~315 |

| Bit # | CONTENT |
|---|---|
| 0 | ON-GOING PROCESSING —401 |
| 1 | NORMAL END —402 |
| 2 | ECC CORRECTION WAS MADE, AND CORRECTION WAS POISSIBLE —403 |
| 3 | ECC CORRECTION WAS MADE, BUT CORRECTION WAS IMPOSSIBLE —404 |
| 4 | PROCESSING EXECUTION IMPOSSIBLE (TIME OVER) —405 |
| 5:15 | SPARE —406 |

FIG.16

| Offset Address | CONTENT |
|---|---|
| 0 | ATTRIBUTE OF AREA SA ~1602 |
| 1 | ATTRIBUTE OF AREA SB ~1603 |
| 2 | ATTRIBUTE OF AREA SC ~1604 |
| 3 | ATRIBUTES OF AREA SD ~1605 |
| 4 | ATTRIBUTE OF AREA SE ~1606 |
| ~P | SPARE AREA ~1607 |

| Offset Address | AREA ATRIBUTE | PARAMETER VALUE | CONTENT |
|---|---|---|---|
| 0 | HEAD ADDRESS OF SDRAM AREA ~1702 | | DESIGNATION OF START ADDRESS OF SDRAM AREA |
| | HEAD ADDRESS OF FLASH AREA ~1703 | | DESIGNATION OF START ADDRESS OF FLASH MEMORY AREA |
| 1 | SDRAM AREA SIZE ~1704 | | DESIGNATION OF SIZE OF SDRAM AREA |
| 2 | UPDATING NUMBER OF TIMES ~1705 | | RECORDING OF UPDATING NUMBER OF TIME OF AREA |
| 3 | THRESHOLD VALUE OF UPDATING NUMBER OF TIMES ~1706 | 0 | WRITING OF DATA IN FLASH MEMORY EACH TIME SDRAM AREA IS UPDATED |
| | | 1~ | NUMBNER OF TIMES OF UPDATING SDRAM AREA UNTIL WRITING OF DATA IN SDRAM AREA |
| 4 | PRE-ERASURE ~1707 | 1 | ERASURE OF DATA OF CORRESPONDING AREA OF FLASH MEMORY WHEN DATA IS WRITTEN IN AREA |
| | | 0 | NO DATA ERASURE |
| 5 | NUMBER OF DATA COPIES ~1708 | 0 | NO DATA COPYING DURING FLASH WRITING |
| | | 1~ | WRITING OF DATA BY MAKING DESIGNATED NUMBER OF COPIES |
| 6 | NUMBER OF WEAR LEVELINGS ~1709 | 0 | NO WEAR LEVELING |
| | | 1~ | NUMBER OF WEAR LEVELINGS |
| 7 | WEAR LEVELING VALUE ~1710 | | CURRENT WEAR LEVELING VALUE WHEN WEAR LEVELING IS VALID |
| 9~q | USER DEFINITION ATTRIBUTE ~1711 | | USER DEFINITION ATTRIBUTE |

1701

FIG.24
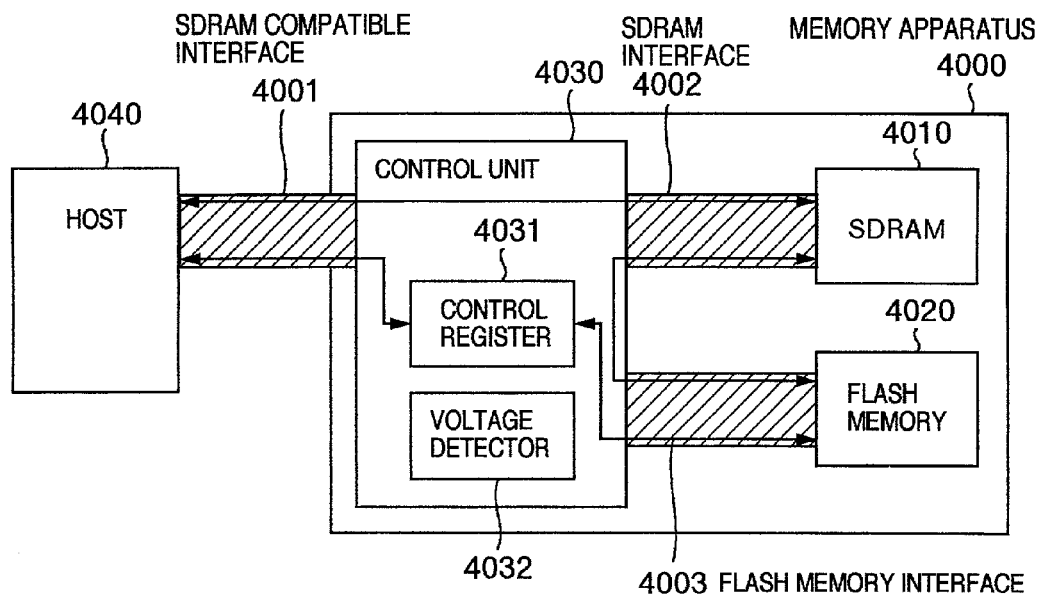
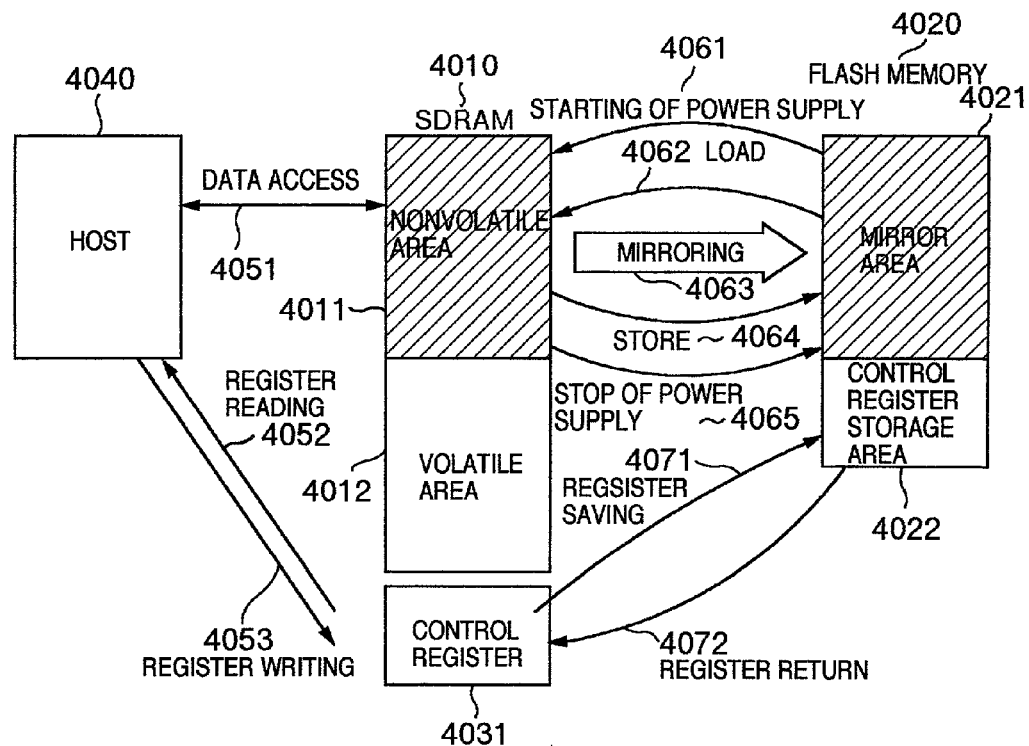

TRANSFERRING DATA BETWEEN VOLATILE AND NON-VOLATILE MEMORIES BASED ON SYSTEM PARAMETERS USING A CONTROLLER

BACKGROUND OF THE INVENTION

The present invention relates to a memory apparatus, which uses a volatile memory and a nonvolatile memory, and to a construction of a high-speed and inexpensive memory system.

In a memory system using a volatile memory and a nonvolatile memory, as described in JP-A-2001-5723, a method is available, in which a content of the nonvolatile memory is copied in the volatile memory when power is turned ON, and the volatile memory is accessed from a host and used. In this case, when power is turned OFF, a content of the volatile memory is copied in the nonvolatile memory, and a result of its processing is notified through an exclusive line to the host. Accordingly, power is safely turned OFF, and data is held even after the power is OFF.

In the above-described conventional art, data transfer between the volatile memory (DRAM) and the nonvolatile memory (flash memory) is carried out only when the power is turned ON or OFF. Thus, no consideration has been given to execution of the data transfer during use of the memory system after the power is ON. As the data transfer targets all the nonvolatile memories, transfer to a large-capacity memory takes time, and preparation until the memory system is ready to be used takes long. In the power-OFF state, since the exclusive line is used to notify the end of copying processing to the host, control is impossible by using only an existing nonvolatile memory interface. In addition, no consideration has been given to accessing of the nonvolatile memory from the host. Furthermore, no consideration has been given to a difference between a data transfer speed of the volatile memory and a data transfer speed of the nonvolatile memory.

SUMMARY OF THE INVENTION

An object of the present invention is to provide a memory apparatus, which enables a host to control data transfer between a volatile memory and a nonvolatile memory, and controllability from the host to be improved.

Another object of the present invention is to provide a memory apparatus, which enables a host to access a nonvolatile memory, and controllability from the host to be improved.

In accordance with the present invention, a control circuit receives a command from a host, interprets it, and starts data transfer between a volatile memory and a nonvolatile memory according to the interpreted command.

In accordance with the present invention, the control circuit starts data transfer between the volatile memory and the nonvolatile memory according to an access command (including data reading and writing) to a predetermined address on the volatile memory from the host.

In accordance with the present invention, a first interface positioned between the host and the control circuit inputs/outputs data read/written in the volatile memory, and a second interface positioned between the host and the control circuit inputs/outputs data read/written in the nonvolatile memory.

In accordance with the present invention, an interface positioned between the host and the control circuit inputs/outputs data read/written in the volatile memory, and data read/written in the nonvolatile memory.

In accordance with the present invention, a holding circuit holds data transferred between the volatile memory and the nonvolatile memory.

Other objects, features and advantages of the invention will become apparent from the following description of the embodiments of the invention taken in conjunction with the accompanying drawings.

BRIEF DESCRIPTION OF THE DRAWINGS

FIG. 2 is a view showing address spaces of an SDRAM and a flash memory according to the present invention.

FIG. 3 is a view showing an example of a group of commands according to the present invention.

FIG. 4 is a view showing an example of status/error information according to the present invention.

FIG. 16 is a view showing an address space management table of the SDRAM and the flash memory according to the present invention.

FIG. 17 is a view showing a detail of the address space management table according to the present invention.

FIG. 24 is a view showing a configuration example of the memory apparatus according to the present invention.

DESCRIPTION OF THE EMBODIMENTS

Figure 1:
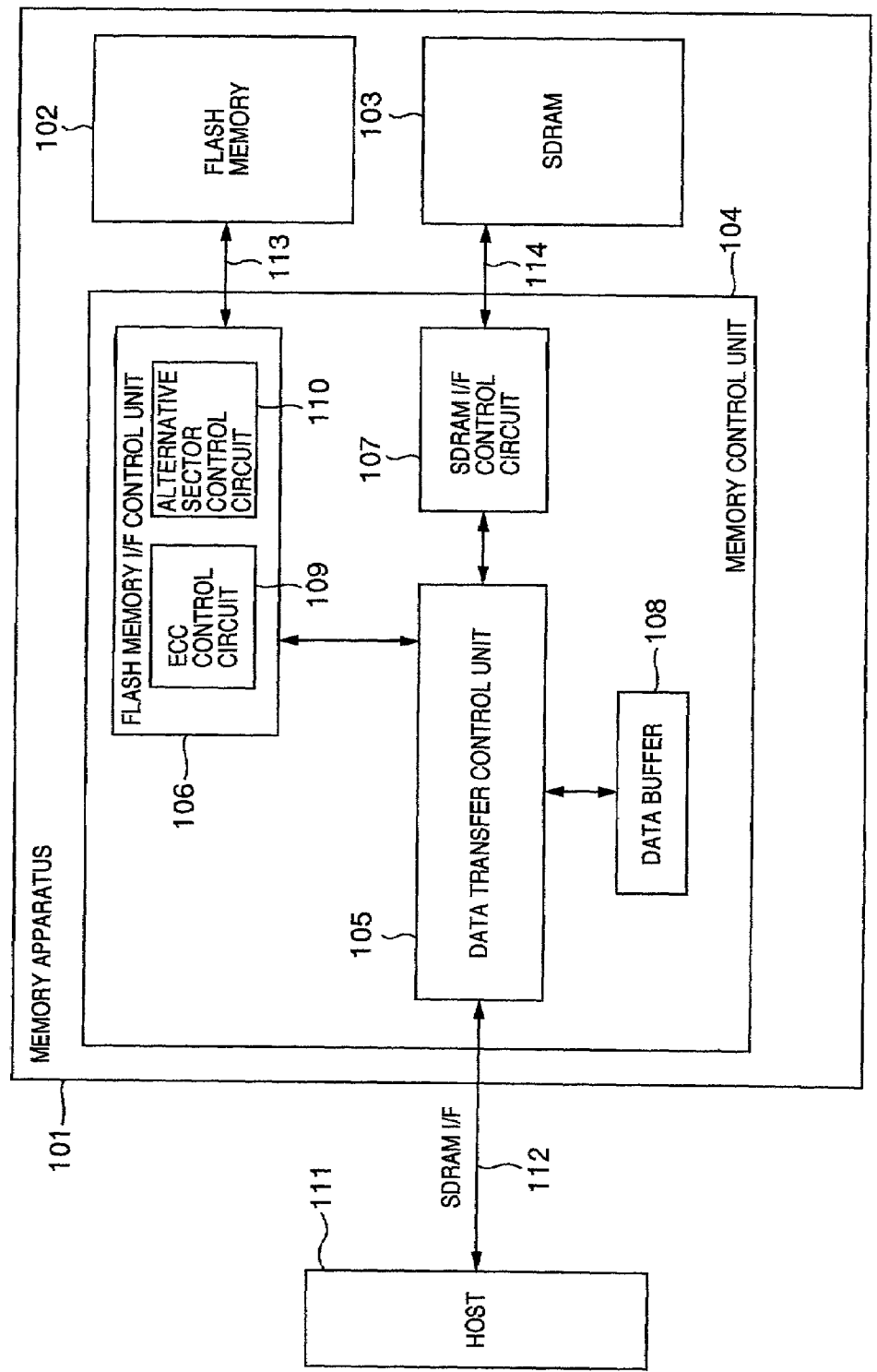
FIG. 1 is a view showing an internal configuration of a memory apparatus according to the present invention.

A memory apparatus 4000 shown in FIG. 24 can be mounted on an information terminal such as a portable telephone set, personal digital assistants (PDA), a music player, a digital camera, a digital video camera, a set top box, a personal computer, or a car navigation system.

The memory apparatus 4000 includes a function of writing data designated by a host 4040 in an address designated by the host 4040, a function of holding the written data for at least a fixed period or more when power is supplied, and a function of outputting the data held in the address designated by the host 4040 to the host 4040. This memory apparatus 4000 also has nonvolatility for holding a part or all of the written data even if power supply is stopped, and includes a function, which enables the host 4040 of the memory apparatus 4000 to designate an address for the memory apparatus 4000, write data therein, and read data therefrom, by an interface 4001 at least having electric compatibility with a synchronous dynamic random access memory (SDRAM)

In this case, the host 4040 is an information processor such as a CPU or ASIC incorporated in the information terminal. In the memory apparatus 4000, operation programs for, for example, enabling the host 4040 to execute various information processing, can be stored.

The operation programs are various applications for, for example an operating system (OS), a driver, a JAVA virtual machine, a JAVA applet, and the like. The information processing may be, for example, operation control of each hardware constituting the information terminal, a data operation, recording/reproducing of a moving image or a voice, or the like. The host 4040 can operate based on the operation programs stored in the memory apparatus 4000 by using the memory apparatus 4000 as a main memory. In the memory apparatus 4000, various data for processing by, for example, the operation programs, can also be stored. Here, the data are various data such as a text, an image, a voice, a moving image and the like, or operation parameters/setting files of the programs. Other data can also be stored.

The memory apparatus 4000 is a volatile memory, but it includes an SDRAM 4010 to be accessed randomly, a flash memory 4020 as a nonvolatile memory, an SDRAM compatible interface 4001 for enabling the host 4040 to access the memory apparatus 4000. The memory apparatus 4000 is connected through the SDRAM compatible interface 4001 to the host 4040. Since the memory apparatus 4000 operates as an SDRAM compatible memory, the host 4040 can control the memory apparatus 4000 by using the SDRAM compatible interface. The memory apparatus 4000 can store a part or all of the data of the SDRAM 4010 in the flash memory 4020. The memory apparatus 4000 can read a part or all of the data of the flash memory 4020. For example, if the data of the SDRAM 4010 is stored in the flash memory 4020 before the power supply to the memory apparatus 4000 is stopped, a data loss of the SDRAM 4010 caused by a stop of the power supply can be prevented. In addition, for example, if the data of the flash memory 4020 is read to the SDRAM 4010 before the host 4040 accesses the memory apparatus 4000 after the power supply to the memory apparatus 4000 is started, the host 4040 can use the memory apparatus 4000 as a nonvolatile SDRAM compatible memory. The memory apparatus 4000 includes a function for enabling the host 4040 to optionally designate data transfer between the SDRAM 4010 and the flash memory 4020. The memory apparatus 4000 also includes an instruction receiving function of receiving its operation instruction from the host 4040, and a status notifying function of notifying a status of the memory apparatus 4000 to the host 4040.

The instruction receiving function and the status notifying function are made operable when the host 4040 reads/writes data of a predetermined format in a predetermined address of the memory apparatus 4000. Thus, since it can use the instruction receiving function and the status notifying function without adding any new dedicated pins for giving an instruction to the memory apparatus 4000 to the SDRAM interface, the host 4040 can easily replace the existing SDRAM 4010 and the memory apparatus 4000. The host 4040 of the memory apparatus 4000 can instruct the memory apparatus 4000 to transfer the data of the SDRAM 4010 to the flash memory 4020, and the data of the flash memory 4020 to the SDRAM 4010 by the instruction receiving function as occasion demands.

The memory apparatus 4000 includes a data storage area having nonvolatility, thus providing high convenience. As a transfer speed equal to that of the normal SDRAM 4010 is provided, transfer time can be shorted compared with the case of direct access to the flash memory. Since the memory apparatus 4000 includes the SDRAM compatible interface 4001, the host 4040 having the SDRAM interface can use the memory apparatus 4000 without any new designing or addition of hardware.

Next, an example of a function of the memory apparatus 4000 will be described.

The memory apparatus 4000 includes a function of passing through a signal of the SDRAM compatible interface 4001 to a signal of the SDRAM interface 4002 of the SDRAM 4010. By such pass-through function of the signal of the SDRAM compatible interface 4001, the host 4040 can use the memory apparatus 4000 as the SDRAM compatible memory apparatus 4000. For example, by a process similar to that of the SDRAM 4010, the host 4040 can issue a reading command, a writing command, a refreshing command or the like to the memory apparatus 4000. The memory apparatus 4000 includes a storage function of transferring data held in a predetermined area of the SDRAM 4010 to a predetermined area of the flash memory 4020. By the storage function, the data transferred to the flash memory 4020 can be held on the flash memory 4020 even if it is lost from the SDRAM 4010 because of a stop of the power supply to the memory apparatus 4000.

The storage function is executed when an operation status of the memory apparatus 4000 satisfies predetermined storage execution conditions. One of the storage execution conditions is, for example a stop of the power supply. One of the storage conditions is, for example issuance of a storage execution instruction from the host 4040. One of the storage execution conditions is, for example taking of a value of a predetermined range by a predetermined register of the memory apparatus 4000. The predetermined register is, for example a counter register for counting the number of times of accessing the memory apparatus 4040 by the host 4040.

The memory apparatus 4000 has storage execution condition information for defining a storage execution condition. The memory apparatus 4000 includes a function of changing the storage execution condition information. The memory apparatus 4000 includes a function for enabling the host 4040 to designate changing of the storage execution information. The memory apparatus 4000 includes a function of saving the storage execution information in the flash memory 4020. The memory apparatus 4000 includes a function of reading the storage execution condition information from the flash memory 4020. The memory apparatus 4000 includes a load function of transferring data held in a predetermined area of the flash memory 4020 to a predetermined area of the SDRAM 4010.

The load function is executed when an operation status of the memory apparatus 4000 satisfies a predetermined load execution condition. One of the load execution conditions is, for example a start of the power supply. One of the load execution conditions is, for example issuance of a load execution instruction from the host 4040. One of the load execution conditions is, for example taking of a value of a predetermined range by a predetermined register of the memory apparatus 4000.

The memory apparatus 4000 has load execution condition information for defining a load execution condition. The memory apparatus 4000 includes a function of changing the load execution condition information. The memory apparatus 4000 includes a function for enabling the host 4040 to designate changing of the load execution condition information. The memory apparatus 4000 includes a function of saving the load execution condition information in the flash memory 4020. The memory apparatus 4000 includes a function of reading the load execution condition information from the load execution condition information. The memory apparatus 4000 includes a function of setting a correspondence between an address of the SDRAM 4010 and an address of the flash memory 4020 according to a predetermined process.

Data transfer in the storage function and the load function is carried out between addresses made corresponding to each other by the address correspondence setting function. The address correspondence setting function is executed based on address correspondence setting information. In the flash memory 4020, a failed area may be present, in which data cannot be normally read/written. Accordingly, for a memory area of the flash memory 4020, it is necessary to prevent use of a failed area present on the flash memory 4020. Thus, based on the address correspondence setting information, correspondence is set between the address of the SDRAM 4010 and the address of the flash memory 4020 in order to prevent data accessing to the failed area.

The memory apparatus 4000 includes an address correspondence setting information storage register for storing the address correspondence setting information. The memory apparatus 4000 includes a function of changing the address correspondence setting information stored in the address correspondence setting information storage register. The memory apparatus 4000 includes a function for enabling the host 4040 to designate changing of the address correspondence setting information. The memory apparatus 4000 includes a function of saving the address correspondence setting information in the flash memory 4020. The memory apparatus 4000 includes a function of reading the address correspondence setting information from the flash memory 4020. The memory apparatus 4000 includes a function of monitoring a power supply status to the memory apparatus 4000.

Next, the configuration of the memory apparatus 4000 will be described more in detail.

The memory apparatus 4000 includes at least the SDRAM compatible interface 4001, the SDRAM 4010, the flash memory 4020, and the control unit 4030. The SDRAM 4010 and the control unit 4030 are connected to each other through an SDRAM interface 4002.

The control unit 4030 and the flash memory 4020 are connected to each other through a flash memory interface 4003. An SDRAM compatible interface 4001 for interconnecting the memory apparatus 4000 and the host 4040 is connected to the control unit 4030.

The memory apparatus 4000 constructs, for example the SDRAM 4010, the flash memory 4020, and the control unit 4030 on different silicon chips, and interconnects terminals of the silicon chips by, for example wire bonding, thereby providing a multichip package, in which the components are sealed in one package. Here, the package indicates an LSI package form such as a thin small outline package (TSOP), or a ball grid array (BGA).

The SDRAM compatible interface 4001 functions between, for example terminal groups for inputting/outputting electric signals to the chips, and has electric characteristics compatible to the SDRAM terminal group. For example, the memory apparatus 4000 has compatibility between the SDRAM and a characteristic of setting-up or holding time of each signal, CAS latency or the like.

Preferably, the SDRAM compatible interface 4001 for interconnecting the host 4040 and the control unit 4030 has compatibility not only between the SDRAM terminal group of, for example JEIDA standard and electric characteristics, but also between the SDRAM terminal group and a package size of the memory apparatus 4000, a terminal group size of for example a pin or a solder ball disposed on the package of the memory apparatus 4000, terminal group disposition or the like.

Thus, the host 4040 including the SDRAM compatible interface 4001 can easily use the SDRAM and the memory apparatus 4000 by replacement.

The SDRAM compatible interface 4001 has a memory area for designating an address in, for example the SDRAM interface, expanded by an amount equivalent to a control register. The SDRAM 4010 is a memory apparatus 4000, which includes a function of writing data designated by the host 4040 in an address designated by the host 4040, a function of holding the written data for at least a fixed period or more if power is supplied, and a function of reading the data stored in the address designated by the host 4040 and outputting it to the host 4040. By executing inputting/outputting of a signal in synchronization with a clock, a data transfer speed is increased more compared with that of the DRAM of no signal synchronization. The SDRAM 4010 includes an SDRAM interface 4002. The SDRAM interface 4002 is a terminal group, in which an external unit such as a host unit (not shown) using the SDRAM 4010 designates an address or data to the SDRAM 4010.

The flash memory 4020 is a memory apparatus, which includes a function of writing data designated by the host 4040 in an address designated by the host 4040, nonvolatility for holding the written data for at least a fixed period or more even if the power supply is stopped, and a function of reading the data stored in the address designated by the host 4040, and outputting it to the host 4040. The flash memory 4020 includes a flash memory interface 4003. The flash memory interface 4003 is a terminal group, in which an external unit such as a host unit (not shown) using the flash memory 4020 designates an address or data to the flash memory 4020.

The control unit 4030 includes a function of controlling operations of the respective units of the memory apparatus 4000. The control unit 4030 includes a function of controlling the operations of the respective units of the memory apparatus 4000, and realizing functions of the memory apparatus 4000. The control unit 4030 includes a function of interconnecting the SDRAM compatible interface 4001 and the SDRAM interface 4002, and relaying data transfer between the host 4030 and the SDRAM 4010. The control unit 4030 includes a storage function of transferring the data held in the predetermined area of the SDRAM 4010 to a predetermined area of the flash memory 4020. The control unit 4030 includes a load function of transferring the data held in the predetermined area of the flash memory 4020 to a predetermined area of the SDRAM 4010. The control unit 4030 includes an address correspondence setting function of setting a correspondence between an address of the SDRAM 4010 and an address of the flash memory 4020 according to a predetermined process. The control unit 4030 includes a control register 4031. The control register 4031 stores various bits of information necessary when the control unit 4030 is operated.

A part or all of the data held in the control register 4031 can be rewritten by the host 4040. A part or all of the data held in the control register 4031 can be read by the host 4040.

When it rewrites the data held in the control register 4031, the host 4040 writes data of a predetermined format in a predetermined address of the control register 4031 through the SDRAM compatible interface 4001. When it read the data held in the control register 4001, the host reads predetermined data from a predetermined address of the control register 4031 through the SDRAM compatible interface 4001.

The control unit 4030 can access an optional control register 4031. Alternatively, the control unit 4030 can inhibit rewriting/reading of data in/from a predetermined register.

Address designation of the control register 4031 can be carried out by a process similar to that for the address designation of the SDRAM. The control register 4031 includes, for example an area in which the host 4040 issues various operation instructions to the memory apparatus 4000. The control register 4031 includes, for example an area in which information for enabling the host 4040 to know an operation status of the memory apparatus 4000 is stored. The control register 4031 includes, for example an area in which load execution condition information and address correspondence setting condition information are stored.

The control unit 4030 includes a voltage detector 4032. The voltage detector 4032 monitors a power supply voltage supplied from an external unit to the memory apparatus 4000. The voltage detector 4032 includes a function of detecting an event that a voltage supplied to the memory apparatus 4000 get into a value in a predetermined range or a supplied voltage is staying in a predetermined range. For example, when power is turned ON for the memory apparatus 4000, the voltage detector 4032 detects that a power supply voltage is larger than a predetermined value. The predetermined value means, for example a voltage value for normally operating the control unit 4030, a voltage value for normally operating the SDRAM 4010, a voltage value for normally operating the flash memory 4020, or the like. Also, for example, the voltage detector 4032 detects that a power supply voltage supplied to the memory apparatus 4000 is smaller than a predetermined value. The predetermined value means, for example a voltage value for normally operating the control unit 4030, a voltage value for normally operating the SDRAM 4010, a voltage value for normally operating the flash memory 4020 or the like.

By using the voltage detector 4032, the control unit 4030 loads data in a predetermined area of the flash memory 4020 to a predetermined area of the SDRAM 4010, for example when power becomes equal to/higher than a predetermined value, and stores the data held in the predetermined area of the SDRAM 4010 in a predetermined area of the SDRAM 4010 when power becomes equal to/lower then a predetermined area. Such processing can be carried out.

Next, a configuration example of a memory area of the memory apparatus 4000 will be described.

The memory 4000 includes at least one or more nonvolatile areas 4011 in a memory area of the SDRAM 4010.

The nonvolatile area 4011 is an area for performing mirroring 4063 by using the flash memory 4020.

In the memory area of the SDRAM 4010, an area other than the nonvolatile area 4011 is a volatile area 4012.

Here, the mirroring 4063 means that data stored in a mirror area 4021 of the flash memory 4020 is brought into coincidence with data stored in the nonvolatile area 4011 of the SDRAM 4010, or that a copy of the data stored in the nonvolatile area 4011 of the SDRAM 4010 is stored in the mirror area 4021 of the flash memory 4020. The mirror area 4021 of the flash memory 4020 is managed based on a logical address excluding a failed area of the flash memory 4020.

The memory apparatus 4000 includes, in the memory area of the flash memory 4020, at least the mirror area 4021 for performing mirroring 4063 of the SDRAM 4010, and a control register storage area 4022 for storing the control register 4031. The mirror area 4021 includes at least an area for storing all the data stored in the nonvolatile area 4011 of the SDRAM 4010.

Since the SDRAM 4010 is a volatile memory, data written in the SDRRAM 4010 is lost when the power supply to the memory apparatus 4000 is stopped. However, as the data stored in the nonvolatile area 4011 can be subjected to mirroring in the mirror area 4021 of the flash memory 4020, the data can be held ever after power is turned OFF. The data stored in the volatile area 4012 is lost when the power is OFF. The host 4040 can access the nonvolatile area 4011 of the SDRRAM 4010, the volatile area 4012 of the SDRAM 4010, and the control register 4031 by designating a predetermined address through the SDRAM compatible interface 4001.

Next, an example of a data transmission path in the memory apparatus 4000 will be described.

Data access 4051 is a path, in which the host 4040 accesses the SDRAM through the SDRAM compatible interface 4001. In this case, the host 4040 can freely access both of the nonvolatile and volatile areas 4011 and 4012.

Register reading 4052 is a path, in which the host 4040 reads various bits of information stored in the control register 4031 through the SDRAM compatible interface 4001. Register writing 4053 is a path, in which the host 4040 writes various bits of information in the control register 4031 through the SDRAM compatible interface 4001. A power supply start 4061 is a path, in which data is loaded from the mirror area 4021 to the nonvolatile area 4010 when the power supply to the memory apparatus 4000 is started. Load 4062 is a path, in which data is loaded from the mirror area 4021 to the nonvolatile area 4010, for example when the host 4040 issues a load execution instruction to the memory apparatus 4000. Store 4064 is a path, through which data is stored to the mirror area 4021 from the nonvolatile area 4010, for example when the host 4040 issues a store execution instruction to the memory apparatus 4000. A power supply stop 4065 is a path, in which data is stored from the nonvolatile area 4010 to the mirror area 4021 when the power supply to the memory apparatus 4000 is stopped.

Next, an operation example of the memory apparatus 4000 configured in the foregoing manner will be described.

Figure 25:
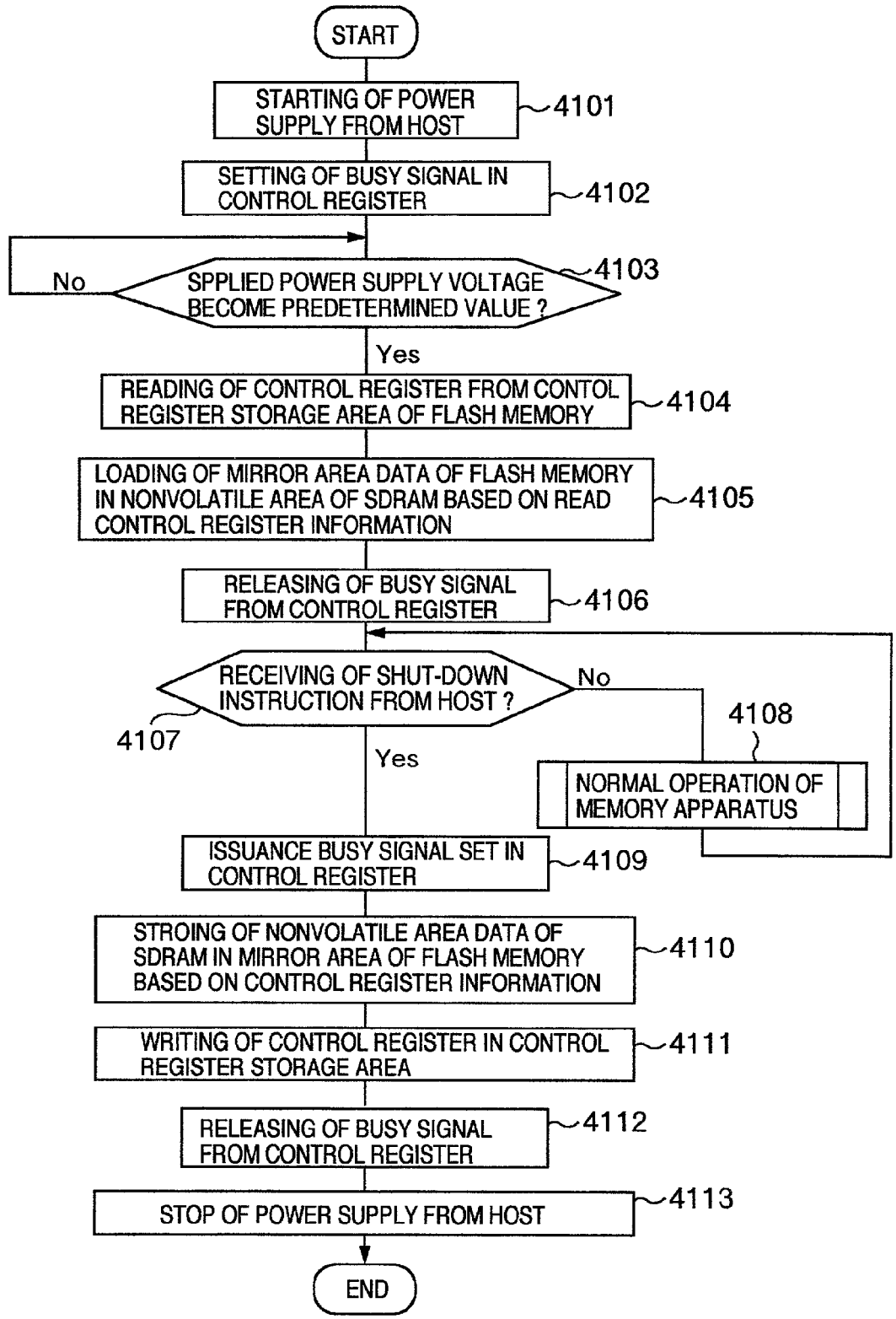
FIG. 25 is a flowchart showing an example of processing from a start of power supply to a stop of the power supply at the memory apparatus according to the present invention.

FIG. 25 is a flowchart showing an operation example of the memory apparatus 4000 from a start of the power supply to a stop of the power supply. First, the host 4040 starts supplying of power to the memory apparatus 4000 (4101). The memory apparatus 4000 loads the data held in the mirror area 4021 of the flash memory 4020 to the nonvolatile area 4011 of the SDRAM 4010 when the power supply is started.

Next, an example of a load processing flow will be described. When a supplied voltage is boosted to enable the voltage detector 4032 to be operated, the memory apparatus 4000 sets a busy signal in the control register 4031 (4102). The busy signal is stored in an predetermined address of the control register 4031 by a predetermined format. The host 4040 can know an internal status of the memory apparatus 4000 by palling data of the address of the control register 4031. During the execution of load processing, the SDRAM compatible interface 4001 and the SDRAM interface 4002 are electrically separated from each other.

By the foregoing processing, access from the host 4040 using the SDRAM compatible interface 4001 to the control register 4031, and load processing from the flash memory 4020 using the SDRAM interface 4002 to the SDRAM 4010 can be executed concurrently. The memory apparatus 4000 monitors a status of the power supply by the voltage detector 4032, and waits until a supplied voltage reaches a predetermined value (4103). Here, the predetermined value means, for example a voltage value for normally operating the SDRAM 4010 and the flash memory 4020.

Then, each of various bits of control information is read from the control register storage area 4022 of the flash memory 4020, and stored in the control register 4031 (4104). Hereinafter, reading of a part or all of the content held in the storage area of the control register 4031 of the flash memory 4020 to the control register 4032 of the control unit 4030 is referred to as register return.

Then, based on address correspondence setting information in the control register 4032, to which the data has been read, data held in the mirror area 4021 of the flash memory 4020 is loaded to the nonvolatile area 4011 of the SDRAM 4010 (4105). After the end of loading, the busy signal of the control register 4031 is released (4106).

After the end of load processing, thereafter, the memory apparatus 4000 operates as the SDRAM compatible memory (4108) until it receives a shut-down instruction from the host 4040. The shut-down instruction is for notifying a stop of the power supply from the host 4040 to the memory apparatus, which is realized by causing the host 4040 to write data of a predetermined format in a predetermined address of the control register 4031. Upon reception of the shut-down instruction from the host 4040, the memory apparatus 4000 sets a busy signal in the control register 4031 (4109). The busy signal is stored in a predetermined address of the control register 4031 by a predetermined format. The host 4040 can know an internal status of the memory apparatus 4000 by polling the address data of the control register 4031. During the executing of storage processing, the SDRAM compatible interface 4001 and the SDRAM interface 4002 are electrically separated from each other. By the foregoing processing, access from the host 4040 using the SDRAM compatible interface 4001 to the control register 4031, and storage processing from the SDRAM 4010 using the SDRAM interface 4002 to the flash memory 4020 can be executed concurrently.

Then, based on address correspondence setting information in the control register 4031, to which the data has been read, data held in the nonvolatile area 4011 of the SDRAM 4010 is stored in the mirror area 4021 of the flash memory 4020 (4110).

Then, various control signals stored in the control register 4031 are written in the control register storage area 4022 of the flash memory 4020 (4111). Hereinafter, writing of a part or all of the content held in the control register 4031 of the control unit 4030 in the storage area of the control register 4031 of the flash memory 4020 is referred to as register saving 4071. After the end of register saving, the busy signal of the control register 4031 is released (4112). The host stops supplying of power to the memory apparatus 4000 when it detects the releasing of the busy signal, by palling of the control register 4031.

When the foregoing process is executed, because of a stop of the power supply to the memory apparatus 4000, the data held in the SDRAM 4010 in the memory apparatus 4000 is lost. However, a copy of a part or all of the data can be held on the flash memory 4020 and, next time the power supply to the memory apparatus 4000 is started, the data held on the flash memory 4020 can be used.

Next, an operation when the memory apparatus 4000 is used as the SDRAM compatible memory is used will be described in detail (4108).

Figure 26:
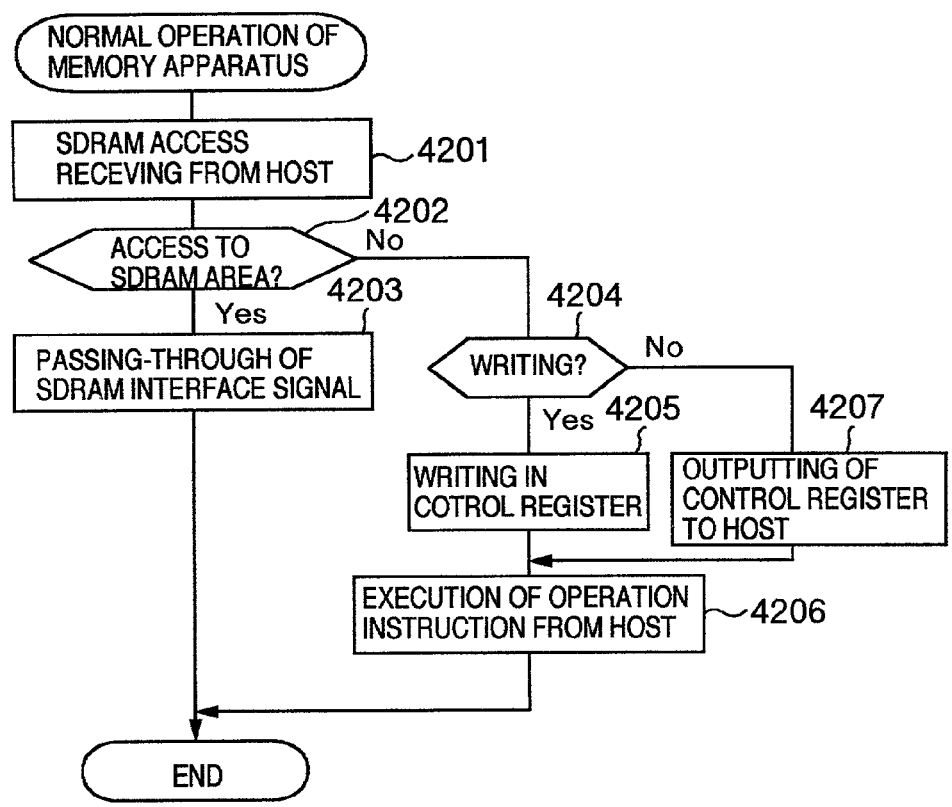
FIG. 26 is a flowchart showing an example of processing of an SDRAM compatible memory operation at the memory apparatus according to the present invention.

FIG. 26 is a flowchart showing a processing example when the memory apparatus 4000 operates as the SDRRAM compatible memory. The memory apparatus 4000 receives various SDRAM operation instructions of reading, writing, refreshing and the like from the host 4040 through the SDRAM interface 4001 (4201).

Then, the processing is branched based on the operation instructions. If the received operation instruction is reading or writing, a memory address designated by the host 4040 is determined (4202). If the received operation instruction is other than reading or wiring, or if the designated memory address designates a memory area of the SDRAM, a signal of the SDRAM compatible interface 4001 is passed through to the SDRAM interface 4002 (4203). By this processing, the memory apparatus 4000 can be operated at the SDRAM compatible memory.

If the received operation instruction is reading or writing, and the designated memory address designates the control register 4031, processing is branched based on a reading instruction or a writing instruction (4204). If the received operation instruction is writing, designated data is written in a designated address of the control register 4031 (4205). If the received operation instruction is reading, the data stored in the designated address of the control register 4031 is outputted through the SDRAM compatible interface 4001 to the host 4040 by a predetermined format (4207). By this processing, the memory apparatus 4000 can receive operation instructions from the host 4040, and notify various bits of information on an operation status of the memory apparatus 4000, and the like to the host 4040 without adding any signal pins to the SDRAM interface.

Then, when the host 4040 issues an operation instruction by accessing the control register 4031, a designated operation is started (4206). Here, the operation may be, for example load processing, storage processing, address correspondence setting processing or he like. During the execution of the operation, to prevent competition of access to the SDRAM 4020, for example SDRAM accessing of the host 4040 is inhibited or ignored. Alternatively, for example, a plurality of SDRAM 4020 may be provided, or the SDRAM 4020 can access a plurality of banks independently, thereby enabling a plurality of processings to be concurrently executed. For example, the processing steps from 4201 to 4203, or from 4201 to 4206 are repeated until a shut-down instruction is issued from the host as indicated at 4107 and 4108 of FIG. 25. That is, the host 4040 can use the memory apparatus 4000 as the SDRAM compatible memory.

The example of using the SDRAM in the memory apparatus 4000 has been described. However, other memories, such as a DDR-SDRAM (double data rate SDRAM) can be used. The example of using the SDRAM compatible interface as the interface for interconnecting the memory apparatus 4000 and the host 4040 has been described. However, other interfaces, such as a DDR-SDRAM interface, can be used. The example of using the flash memory 4020 as the nonvolatile memory has been described. However, other nonvolatile memories can be used.

Next, a more specific embodiment of the memory apparatus 4000 according to the present invention will be described.

FIG. 1 shows an example of an internal configuration of memory apparatus 101 according to an embodiment of the present invention. The memory apparatus 101 includes a flash memory 102 as a nonvolatile memory, an SDRAM (synchronous SDRAM) 103 as a volatile memory, and a memory control unit 104 for controlling the memories. The memory control unit 104 controls data transfer or the like between a host 111 and the memory apparatus 101, and between the flash memory 102 and the SDRAM 103 in response to a request from the host 111. Normally, the host 111 directly accesses the SDRAM 103 through an SDRAM interface 112. However, by performing writing in a particular address, the host 111 can instruct internal processing of the memory apparatus 101 such as data transfer between the flash memory 102 and the SDRAM 103, or formatting of the flash memory 102. The host 111 may be, for example a portable telephone set, a portable information terminal (PDA), a personal computer, a music player (recorder), a camera, a video camera, a set top box terminal or the like.

The memory control unit 104 includes a data transfer control unit 105, a flash memory interface control unit 106, an SDRAM interface control circuit 107, and a data buffer 108. When the host 111 directly accesses the SDRAM 103, the data transfer control unit 105 an the SDRAM interface control circuit 107 are passed through. The data transfer between the flash memory 102 and the SDRAM 103 is carried out through the data buffer 108 to absorb a transfer speed difference between the two devices. When data is transferred from the flash memory 102 to the data buffer 108 (reading from the flash memory 102), an ECC control circuit 109 in the flash memory interface control unit 106 checks whether an errors is present or not in data read from the flash memory 102, and corrects the data if an error is present. In this case, if a sector as a target for reading is a failed sector, an alternative sector control circuit 110 detects an alternative sector as a target for reading, and data is read from the detected alternative sector. When data is transferred from the data buffer 108 to the flash memory 102 (writing in the flash memory 102), the read data is transferred from the data buffer 108 through the data transfer control unit 105 to the flash memory interface control unit 106. The flash memory interface control unit 106 generates ECC for the transfer data. The generated ECC is written together with the transfer data in the flash memory 102. In this case, if a sector as a target for writing is a failed sector, the alternative sector control unit 110 detects an alternative sector for the failed sector, and data is written in the detected alternative sector.

FIG. 2 shows an example of address spaces of the SDRAM 103 and the flash memory 102, and a using method thereof. The address space of the SDRAM 103 includes a system work area 201, a command/status holding area 202, a volatile area 203, and a nonvolatile area 204. In the system work area 201, information necessary for system management by the host 111 is stored (it may be stored in a later-described volatile area 203). The command/status holding area 202 is provided to instruct internal processing to the memory apparatus 101. in the volatile area 203, information necessary for application processing by the host 111 is stored. A content of the volatile area 203 is erased when power is turned OFF for the memory apparatus 101. In the nonvolatile area 204, information that must be held even after the power is turned OFF is stored. Since the SDRAM 103 is a volatile memory, the information stored in the nonvolatile area 204 on the SDRAM 103 is copied to the flash memory 102 before the power is turned OFF, and held on the flash memory 102.

Use of the foregoing address space on the SDRAM 103 enables the following processing to be executed. After the power is turned ON, program data on the flash memory 102 is copied to the volatile area 203 of the SDRAM 102, and the host 111 can use the program by accessing the volatile area 203 on the SDRAM 103. In this case, the program data stored in the volatile area 203 is discarded when the power is turned OFF. However, no problems occur because the program data is held on the flash memory 102. After the power is turned ON, user data on the flash memory 102 is copied to the nonvolatile area 204 of the SDRAM 103, and the host 111 can use the user data by accessing the nonvolatile area 204 on the SDRAM 102. If the user data is slightly changed or contains an addition, the user data is copied to the flash memory 102, and held on the flash memory 102.

FIG. 3 shows an example of a processing content instructed by the host 111 to the memory apparatus 101, i.e., a command. An address of the command is mapped in the foregoing command/status holding area 202, and disposed in an address set by adding an offset address 301 from a head address A209 of the command/status holding area 202. An address 0 designates a head address (ADRsadB 210) of the volatile area 203, an address 1 a size (y) of the volatile area 203, an address 2 a head address (ADRsdC 211) of the nonvolatile area 204, and an address 3 a size (z) of the nonvolatile area 204. Thus, the volatile area 203 and the nonvolatile area 204 can be mapped in optional address spaces on the SDRAM 103. In the embodiment, the command/status holding area 202 is set to a predetermined fixed value. However, by applying definition similar to the above, mapping can be made in an optional space. In this case, a head address (ADRsdA 209) of the command/status holding area 202 to be accessed first by the host is stored beforehand in the register or the flash memory 102 in the memory apparatus 101. An address 4 designates a format of the flash memory 102, an address 5 a start sector address (Dtx 213) in data transfer to the flash memory 102 or erasure, an address 6 data transfer start address (Ctx 212) to the SDRAM 103, an address 7 a data transfer size between the flash memory 102 and the SDRAM 103, or a data erasure size of the flash memory 102, an address 8 a start of data transfer between the flash memory 102 and the SDRAM 103, and an address 9 a power saving mode. When a command corresponding to the address 9 is issued, power to the flash memory 102, and the circuit for controlling the flash 102 is turned OFF.

The memory apparatus 101 stores status/error information 314 in an address n+1 in order to notify a processing status of the command issued from the host 111 to the same. After the issuance of the command, the host 111 can know a processing result of the issued command by accessing a memory area indicated by the address n+1.

FIG. 4 shows an example of status and error contents. Bit0 indicates on-going processing of a command (401), Bit1 a normal end of processing (402), Bit2 execution of the foregoing ECC correction, and possibility of correction, Bit3 execution of ECC correction, but impossibility of correction (404), and Bit4 impossibility of execution of command processing (405).

Figure 5:
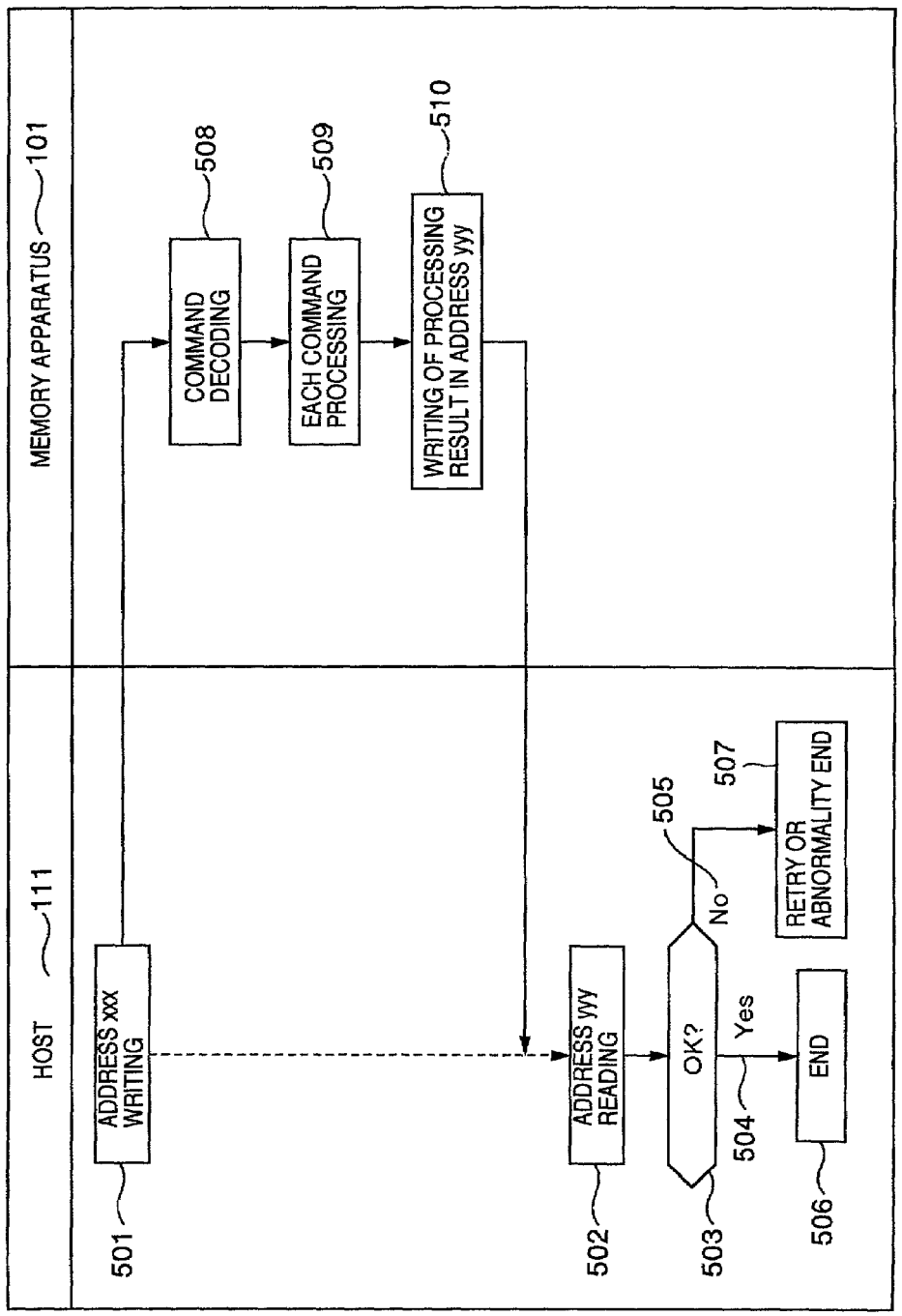
FIG. 5 is a processing flowchart of a host and the memory apparatus according to the present invention.

FIG. 5 is a flowchart showing a system processing process when the foregoing command is issued. The host 111 issues a command to the memory apparatus 101 by writing data in the foregoing address (501). Upon reception of the command, the memory apparatus 101 decodes the command (508), and executes internal processing for the issued command based on a result of the decoding (509). After the end of processing, the memory apparatus 101 writes a result in the address n+1 for storing status/error information (510). The host 111 reads the address (502), and determines whether processing designated by the command has normally ended or not (503). If the processing has not normally ended (505), the processing designated by the command is retried, or ended as abnormality (507).

According to the present invention, functions for executing the foregoing processing steps are provided on the memory control unit 104 shown in FIG. 1. Hereinafter, the data transfer control unit 105 as a main constituting element of the memory control unit 104 is described in detail.

Figure 6:
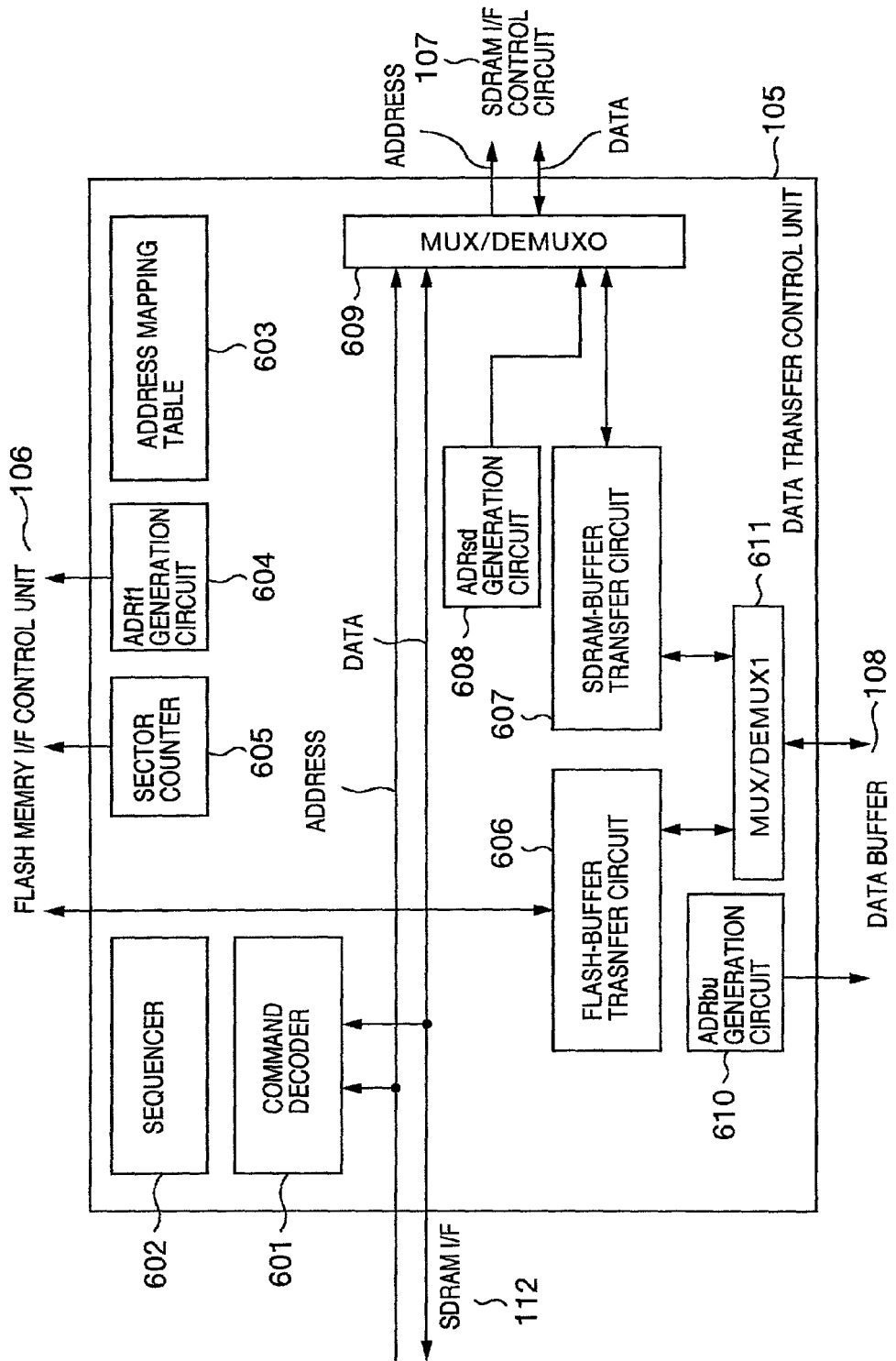
FIG. 6 is a view showing an internal configuration of a data transfer control unit according to the present invention.

FIG. 6 shows an internal configuration of the data transfer control unit 105. The data transfer control unit 105 includes a command decoder 601, a sequencer 602, an address mapping table 603, a flash address (ADRfl) generation circuit 604, a sector counter 605, a flash-buffer transfer circuit 606, an SDRAM-buffer transfer circuit 607, an SDRAM address (ADRsd) generation circuit 608, an MUX/DUXEMUX 0 (609), a buffer address (ADRbu) generation circuit 610, and an MUX/DEMUX 1 (611). The command decoder 601 interprets a content of the command issued by the host 111. The sequencer 602 manages entire processing of the data transfer control unit 105.

Figure 7:
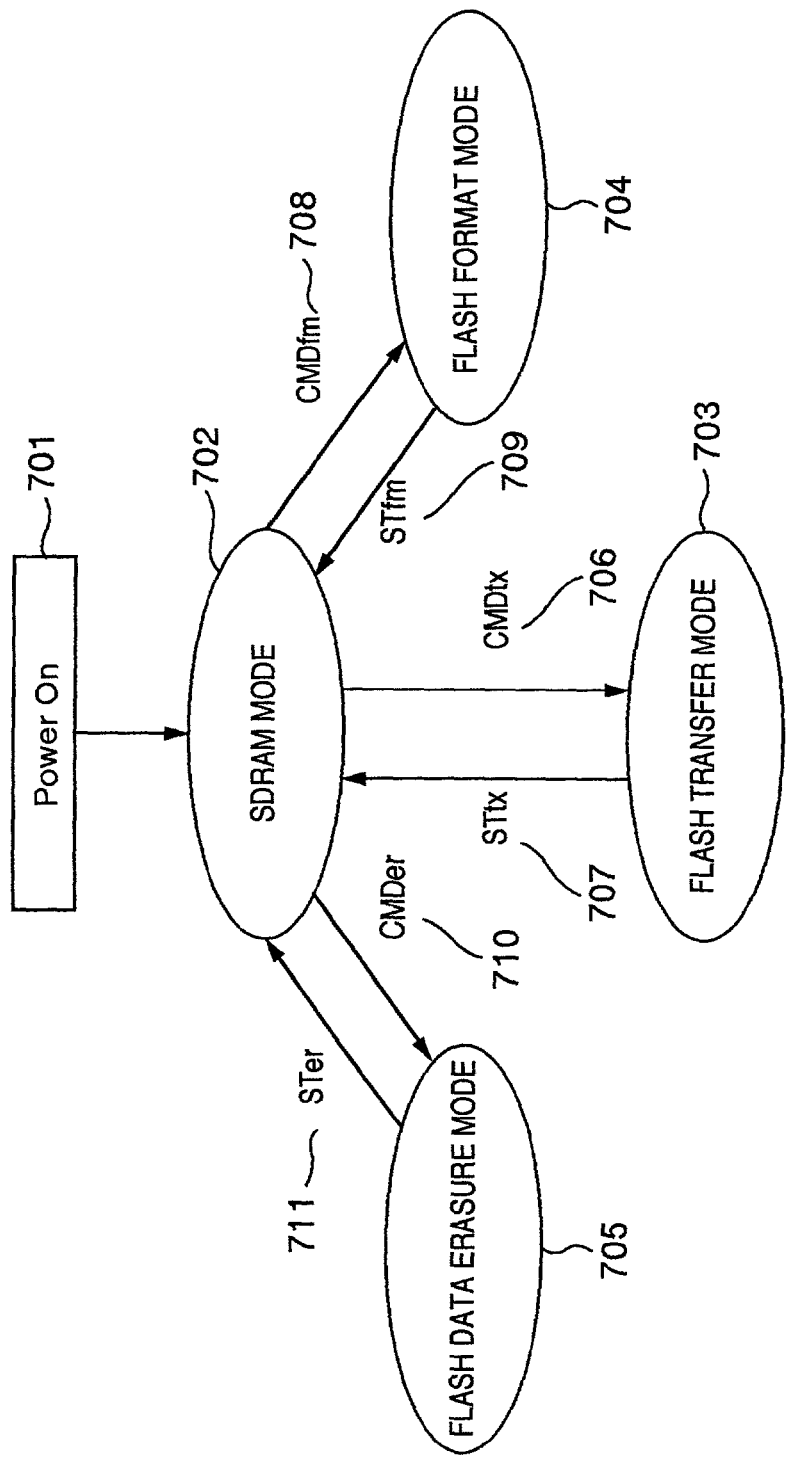
FIG. 7 is a view showing status transition of a sequencer according to the present invention.

FIG. 7 shows an example of status transition of the sequencer 602. After power is turned ON for the memory apparatus 101, the sequencer 602 changes to an SDRAM mode 702, and the memory apparatus 101 is operated as the SDRAM 103. Then, a status of the sequencer 602 is placed under transition based on a command issued from the host 111. If the host 111 issues a command CMDtx 706 (address 8 shown in FIG. 3) for starting data transfer of the flash memory 102, the sequencer 602 changes to a flash transfer mode 703. When processing of the data transfer is ended, and during writing of STtx 707 (writing in the address n+1 of FIG. 3) for writing its status information, the sequencer 602 is changed again to the SDRAM mode 702. If a command CMDfm 708 (address 4 in FIG. 3) for formatting the flash memory 102 is issued, the sequencer 602 is changed to a flash format mode 704. After the end of processing, the sequencer 602 is changed to the SDRAM mode 702 after execution of status writing STfm 709. If a command CMDer 710 (address 10 in FIG. 3) for deleting data on the flash memory 102 is issued, the sequencer 602 is changed to a flash data erasure mode 705. After the end of processing, the sequencer 602 is changed to the SDRAM mode 702 after execution of status writing STer 711.

Explanation is continued by referring again to FIG. 6. The mapping table 603 is for allocating the nonvolatile area 204 on the address space in the SDRAM 103 to the logical sector address 205 of the flash memory 102. The ADRfl generation circuit 604 generates a logical sector address on the flash memory 102. The sector counter 605 manages the number of data transfer sectors in the flash memory 102 based on a transfer size designated by the host 111. The flash-buffer transfer circuit 606 executes data transfer between the flash memory 102 and the data buffer 108. Similarly, the SDRAM-buffer transfer circuit 607 executes data transfer between the SDRAM 103 and the data buffer 108. The ADRsd generation circuit 608 generates an address for accessing the SDRAM 103. In writing, the MUX/DEMUX 0 (609) selects either one of an SDRAM interface 112 bus connected to the host 111 and an SDRAM interface bus 112 generated in the data transfer control unit 105, and sends it to the SDRAM interface control circuit 107. In reading, data of the SDRAM 103 sent from the SDRAM interface control circuit 107 is sent to the data bus of the SDRAM interface 112 connected to the host, or the SDRAM-buffer transfer circuit 607. The ADRbu generation circuit 610 generates an address of the data buffer 108. The MUX/DEMUX 1 (611) sends an output data bus of the flash-buffer transfer circuit 606 or the SDRAM-buffer transfer circuit 607 to the data buffer 108 in writing in the data buffer 108. When data is read from the data buffer 108, the data is sent to the flash-buffer transfer circuit 606 or the SDRAM-buffer transfer circuit 607.

Hereinafter, an operation of each circuit is described by taking an example of data transfer processing from the flash memory 102 to the SDRAM 103.

The host 111 designates a transfer start logical sector address (Dtx 213) of the flash memory 102 side before data transfer is started (address 5 in FIG. 3). As a method of designating an address, other than the method of designating the Dtx 213, a method of designating an address (Ctx 212) on the SDRAM 103 can be used. In this case, the Ctx 212 is converted into Dtx 213 based on the address mapping table 603. The Dtx 213 is held in the ADRf 1 generation circuit 604, and sent to the flash memory interface control circuit 106. The host 111 sets a transfer size by using a command (address 7 in FIG. 3) for setting a data transfer size. The set transfer size is held in the sector counter 605. Here, if a transfer size is designated by a byte unit, information of the transfer size is converted into a sector unit at the counter 605, and sent to the flash memory interface control unit 106. Further, the host 111 issues a command (address 6 in FIG. 3) for setting a transfer start address Ctx 212 of the SDRAM 103. The Ctx 212 is held in the ADRsd generation circuit 608.

After a command CMDtx 706 for starting data transfer is issued, a content of the command is interpreted by the command decoder 601. The sequencer 602 changes its status to the flash transfer mode 703, and instructs sending of outputs of the ADRsd generation circuit 608 and the SDRAM-buffer transfer circuit 607 through the MUX/DEMUX 0 (609) to the SDRAM interface circuit 107. Also, the flash memory interface control unit 106 is instructed to read data on the number of transfer sectors designated by the logical address Ctx 213 from the flash memory 102. The read sector data (SCTn) is transferred through the flash-buffer transfer circuit 606 and the MUX/DEMUX 1 (611) to the data buffer 108. Then, the data is transferred from the data buffer 108 through the SDRAM-buffer transfer circuit 607 and the MUX/DEMUX 0 (609) to the SDRAM interface control circuit 107, and written in the SDRAM 103.

Figure 8:
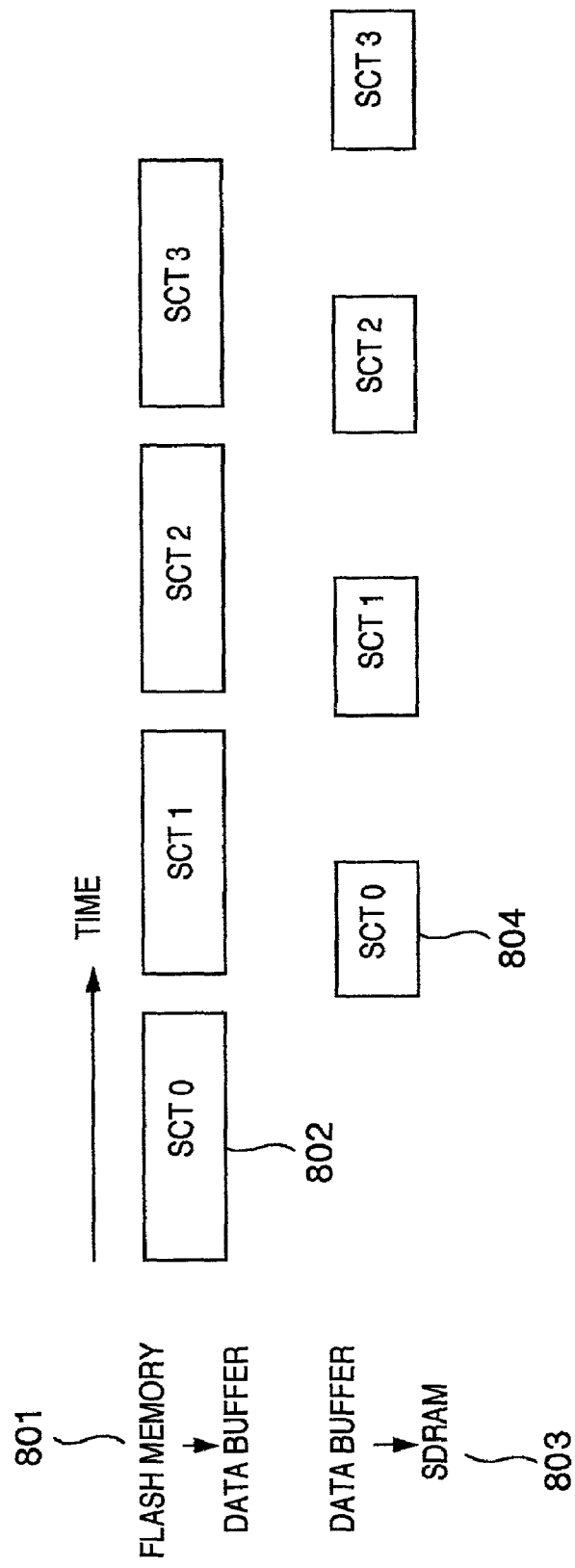
FIG. 8 is a timing chart of data transfer according to the present invention.

FIG. 8 shows an example of a timing for data transfer. When one sector (SCT 0 (802)) is transferred from the flash memory 102 to the data buffer 108, data transfer from the data buffer 108 to the SDRAM 103 is started (804), and data transfer from the flash memory 102 to the data buffer 108 is continued (transfer of SCT 1). Data transfer from the SDRAM 103 to the flash memory 102 is carried out through a path reverse to the above transfer path.

As described above, by executing the data transfer from the flash memory 102 to the SDRAM 103 according to the command from the host 111 beforehand, the host 111 can access data on the SDRAM 103 at a high speed. Moreover, by transferring the data on the SDRAM 103 to the flash memory 102, the data can be held even after the power is turned off.

Figure 9:
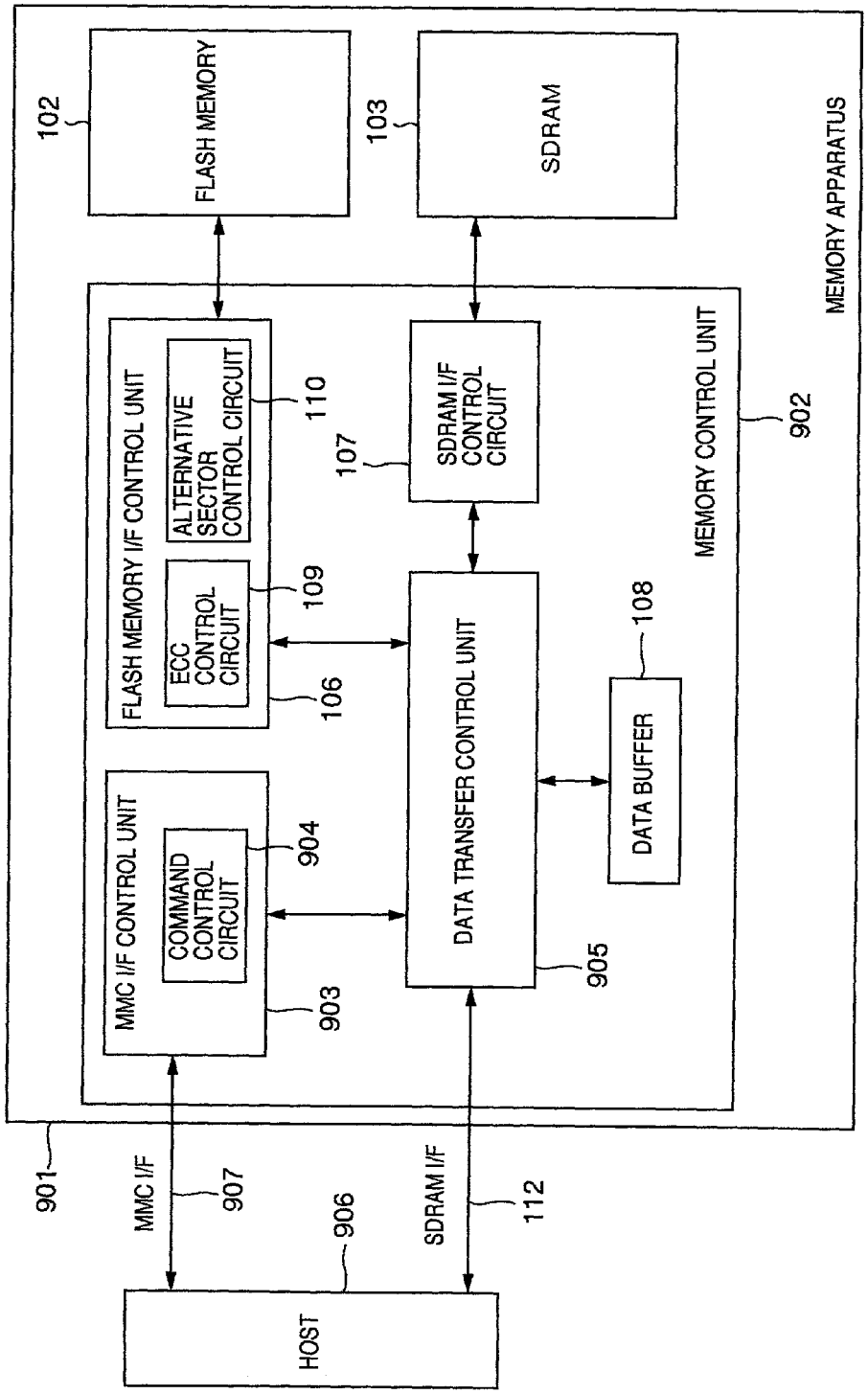
FIG. 9 is a view showing an internal configuration of another memory apparatus according to the present invention.

FIG. 9 shows a memory apparatus according to a second embodiment of the present invention. As an interface for connection with a host 906, in addition to the SDRAM interface 112 shown in FIG. 1, the memory apparatus 901 includes a MultiMediaCard (MultiMediaCard is a registered trade mark of Infineon Technologies AG, abbreviated to "MMC", hereinafter) interface 907. The MMC is a memory card using the flash memory 102 as a storage medium. The host 906 carries out data reading/writing in the flash memory 102 by issuing an MMC command. That is, the memory apparatus 901 includes a function as an MMC in addition to the foregoing data transfer between the memories. Thus, the MMC interface 907 in the memory apparatus 901 is compliant with MMC specifications.

Figure 10:
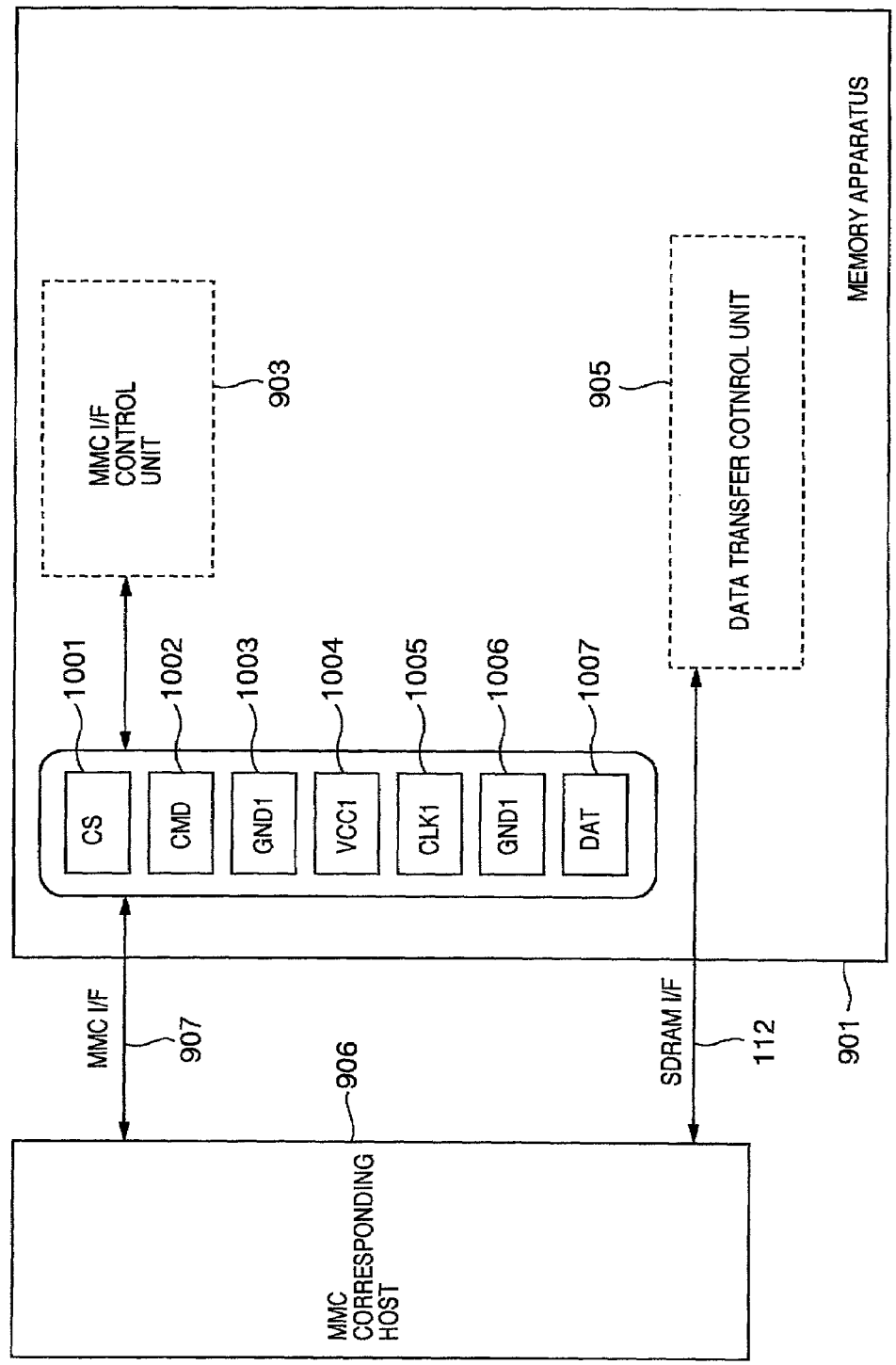
FIG. 10 is a view showing a terminal configuration of an MMC interface according to the present invention.

As shown in FIG. 10, the MMC interface 907 includes totally seven terminals, i.e., a chip select terminal (CS) 1001, a command terminal (CMD) 1002, two ground terminals (GND 1) 1003 and 1006, a power supply terminal (VCC 1) 1004 from the host 906, a clock terminal (CLK 1) 1005, and data (DAT) 1007. The CS 1001 is an input terminal used in an operation on an SPI mode of the MMC, becoming active at a low level. The CMD 1002 is an input-output terminal used by the host 906 to transmit a memory card command compliant with MMC specifications to the memory apparatus 901 or receive a memory card response compliant with the same specifications from the memory apparatus 901. the DAT 1007 is an input-output terminal used by the host 906 to transmits input data of a form compliant with memory card interface specifications to the memory apparatus 901, or receive output data of a form compliant with the same specifications from the memory apparatus 901. The CLK 1 (1005) is a terminal, to which a clock signal supplied from the host 906 is inputted. When the host 906 transmits/receives a memory card command or a memory card response through the CMD 1002, or host data through the DAT 1007, a clock signal is inputted to the CLK 1 (1005). If a transfer speed of the MMC interface 907 becomes a bottleneck, data may be transferred in parallel by changing the specifications of the MMC interface 907, and increasing a clock frequency of the CLK 1 (1005) or using a plurality of DAT 1007.

An internal configuration of the memory apparatus 901 is different from that of the memory apparatus 101 shown in FIG. 1 in that the MMC interface control unit 903 is added, and the MMC interface control unit 903 is connected to the data transfer control unit 905. Here, in the previous embodiment, the command issuance from the host 111 was executed through the SDRAM interface 112. In the configuration of the present embodiment, however, it can be executed through the MMC interface 907. That is, the command shown in FIG. 3 can be issued as an MMC command from the host 906 to the memory apparatus 901. A content of the issued command is interpreted by the command control circuit 904 at the MMC interface control unit 903. This is a function similar to that of the command decoder 601 described above with reference to FIG. 6.

Figure 13:
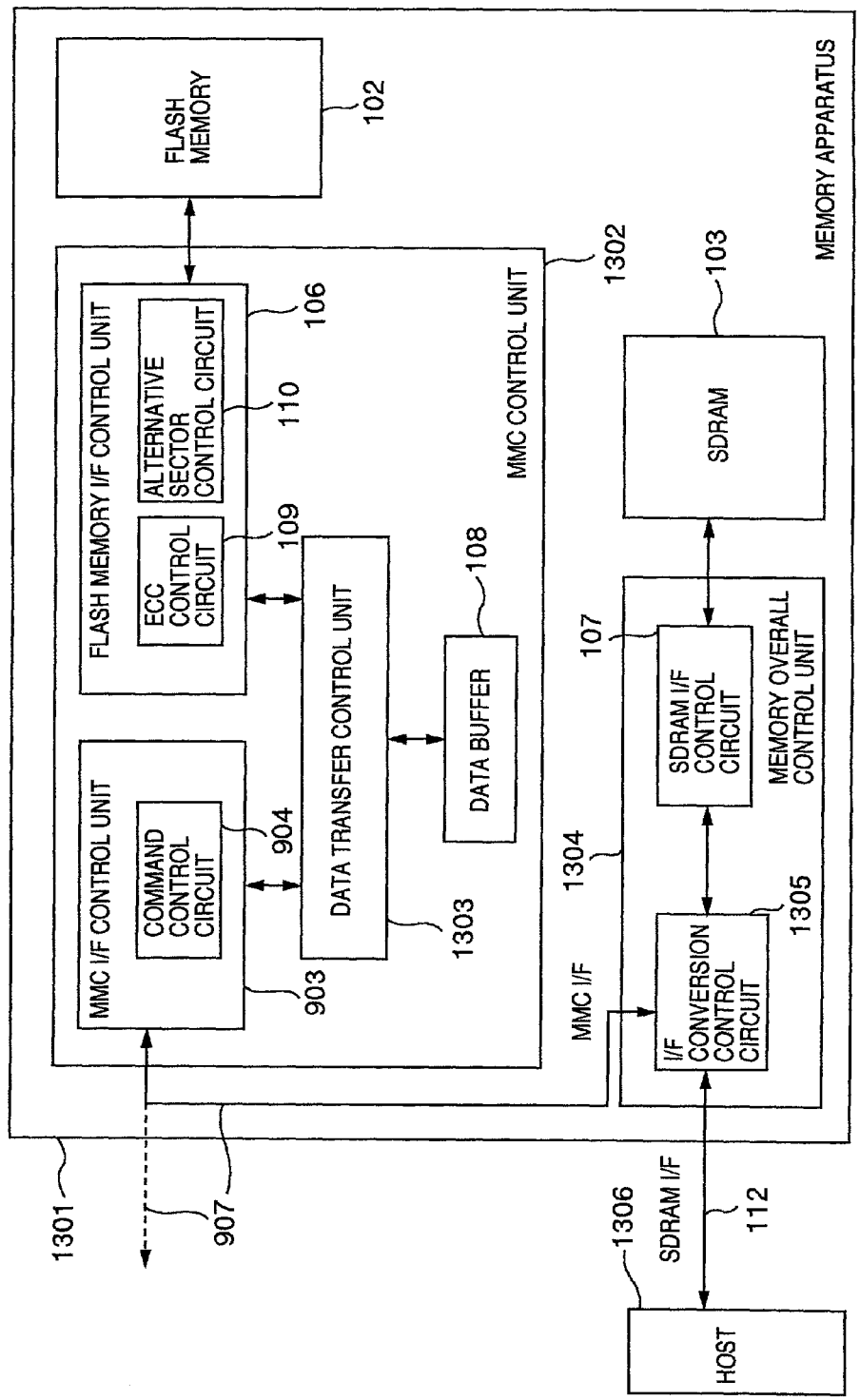
FIG. 13 is a view showing an internal configuration of yet another memory apparatus according to the present invention.

As an arrangement for realizing a function similar to the above, an internal configuration shown in FIG. 13 may be employed. This configuration includes an MMC control unit 1302 having a function necessary for realizing a function as MMC, a flash memory 102, a memory overall control unit 1304, and an SDRAM 103. The memory overall control unit 1304 includes an interface conversion control circuit 1305 having a function of converting the MMC interface 907 and the SDRAM interface 112, and an SDRAM interface control unit 107. In this case, by directly using the MMC control LSI, a function similar to that of the second embodiment can be provided to a host 1306 having no MMC interfaces 907 (through the SDRAM interface 112).

Figure 11:
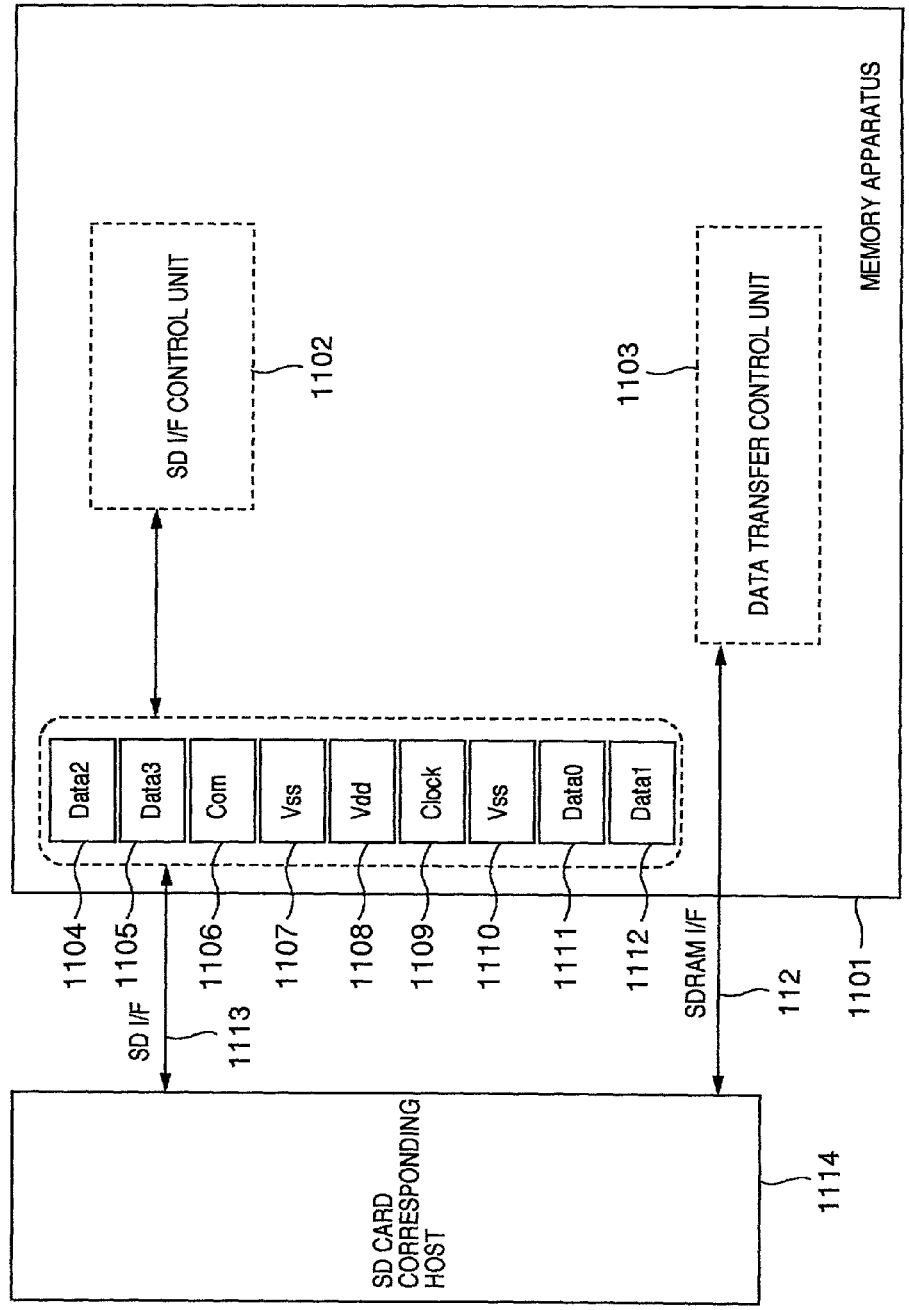
FIG. 11 is a view showing a terminal configuration of an SD card interface according to the present invention.
Figure 12:
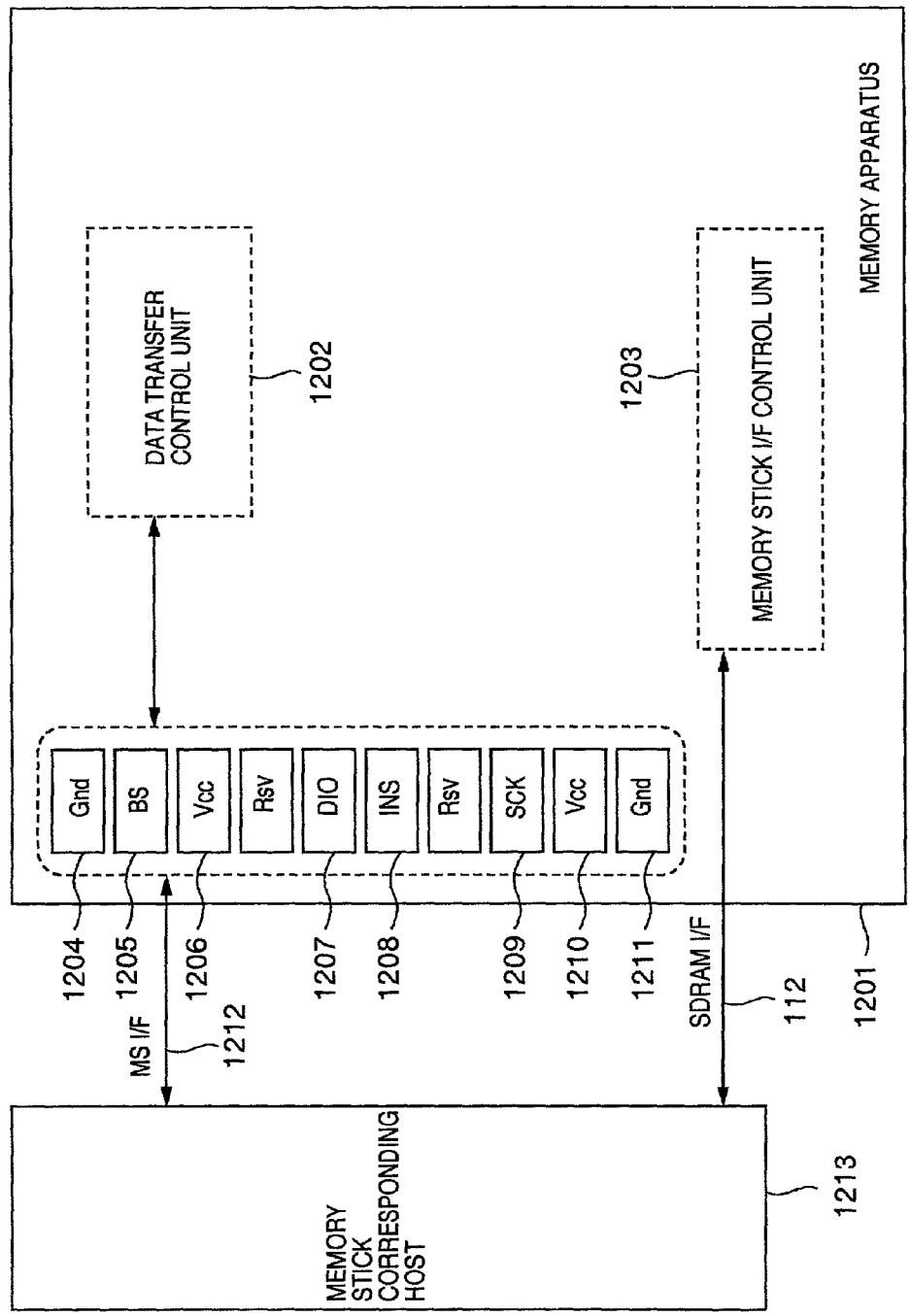
FIG. 12 is a view showing a terminal configuration of a memory stick interface according to the present invention.

The present invention is not limited to the foregoing MMC interface 907, but it can be applied to various interfaces. FIGS. 11 and 12 schematically show internal configurations of memory apparatus 1101 and 1201, in which the present invention is applied to interfaces of an SD card (small memory card having a width of 24 mm, a length of 32 mm, and a thickness of 2.1 mm, nine external terminals, and flash memory loaded), and a memory stick (registered trade mark of Sony Corporation).

The SD card has nine external terminals, which are positioned from an end in the order of a Data 2 terminal 1104, a Data 3 terminal 1105, a Com terminal 1106, a Vss terminal 1107, a Vdd terminal 1108, a Clock terminal 1109, a Vss terminal 1110, a Data 0 terminal 1111, and a Data 1 terminal 1112. The Vdd terminal 1108 is a power supply terminal, the Vss terminal 1107 a ground terminal, the Data 0 terminal 1111, the Data 1 terminal 1112, the Data 2 terminal 1104 and the Data 3 terminal 1105 data input-output terminals, the Com terminal 1106 a command input-output terminal, and the Clock terminal 1109 a clock input terminal. In this case, interface specifications of an SD card corresponding host 1114 connected to an external unit are different from the MMC specifications. However, since the external terminal greatly similar to the MMC external terminal is provided, and the apparatus has a characteristic of being operated by issuing a command from the external unit as in the case of the MMC, the present invention can be applied.

On the other hand, the memory stick includes ten external terminals, which are positioned from an end in the order of a Gnd terminal 1204, a BS terminal 1205, a Vcc terminal 1206, a DIO terminal 1207 omitting one reservation terminal Rsv, an INS terminal 1208, an SCK terminal 1209 omitting one reservation terminal Rsv, a Vcc terminal 1210, and a Gnd terminal 1211. The Vcc terminal 1206 is a power supply terminal, the Gnd terminal 1204 a ground terminal, the DIO terminal 1207 a command and data input-output terminal, and the SCK terminal 1209 a clock input terminal. Interface specifications of a memory stick corresponding host 1213 connected to the external unit are different from the MCC specifications. However, the memory stick has a characteristic of being operated by issuing a command from the external unit as in the case of the MMC. Thus, the present invention can be applied.

As described above, the host 906 including the MMC interface 907 and the SDRAM interface 112 can use the memory apparatus 901 not only as the high-speed volatile and nonvolatile memory but also as the MMC.

Figure 14:
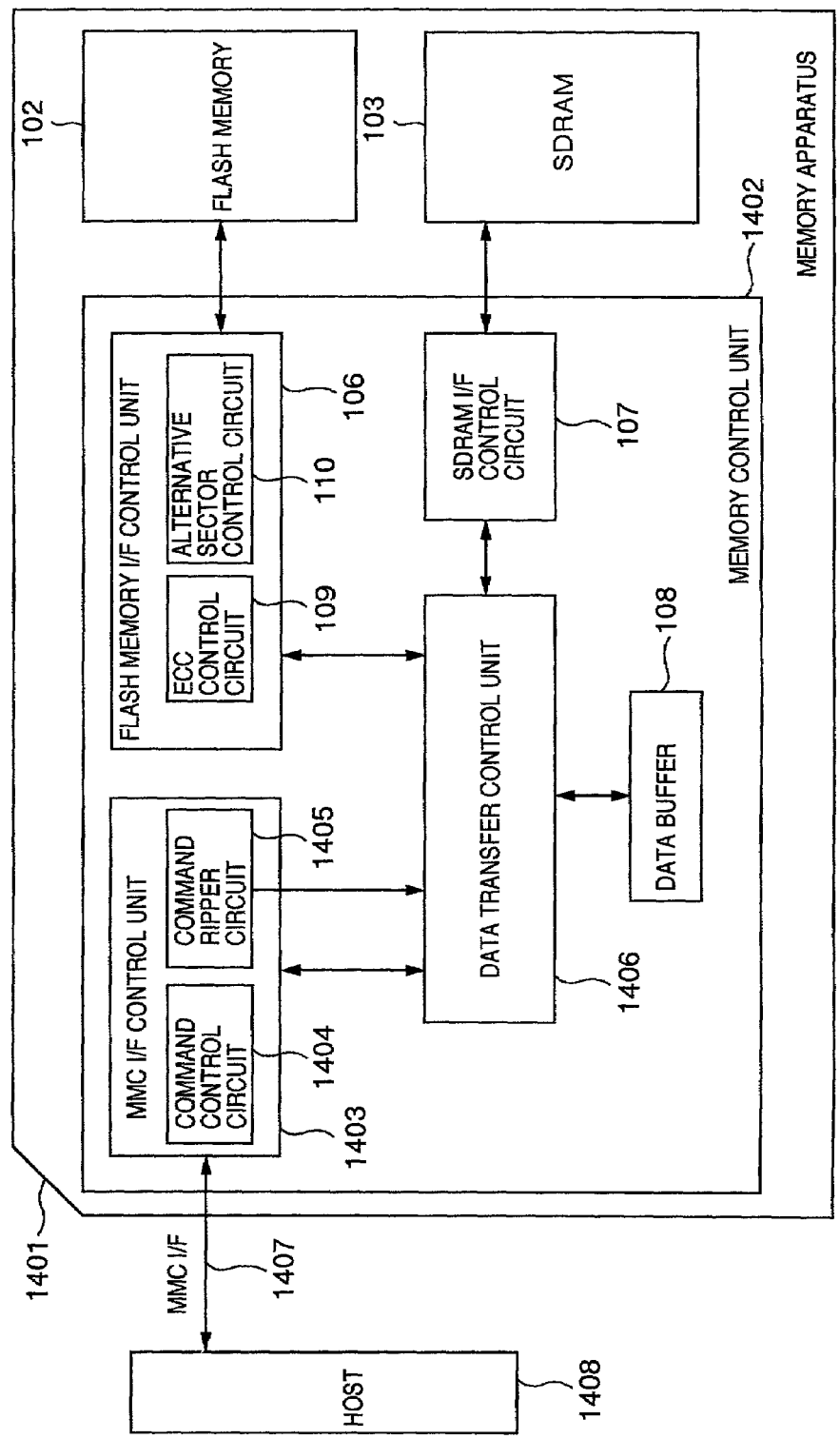
FIG. 14 is a view showing an internal configuration of yet another memory apparatus according to the present invention.

FIG. 14 shows a memory apparatus 1401 according to a third embodiment of the present invention. The memory apparatus 1401 includes an MMC interface 1407 as an interface with a host 1408. The memory apparatus 1401 of the present embodiment is card-shaped. However, a shape is not limited to a card, and the apparatus can be treated as in the case of the previous embodiment. An internal configuration of the memory apparatus 1401 shown in FIG. 14 is different from that of the memory apparatus 901 shown in FIG. 9 in that a command ripper circuit 1405 is added in an MMC interface control unit 1403, and its output is connected to a data transfer control unit 1406. Another difference is that connection with the host 1408 is made not through the SDRAM interface 112, but only through the MMC interface 1407. Other components are similar to those of FIG. 9.

In the previous embodiments, access to the SDRAM 103 from the hosts 111 and 906 was carried out through the SDRAM interface 112. In the configuration of the present embodiment, however, access to the SDRAM 103 is also carried out through the MMC interface 1407. That is, in addition to its function as the MMC, the memory apparatus 1401 can issue a command for instructing data transfer between the flash memory 11 102 and the SDRAM 103, or access the SDRAM 103 from the MMC interface 1407. As an example of realizing the above access, a command of data writing/reading in the SDRAM 103 may be formed into a capsule in a command area by using a newly defined MMC command, and issued to the MMC 1401. In this case, a command for requesting access to the SDRAM 103 is detected at the command control circuit 1404 of the MMC interface control unit 1403, access request information is taken out at the command ripper circuit 1405, and sent to the command decoder 601 (see FIG. 6) of the data transfer control unit 1406. Accordingly, as in the case of the previous embodiments, the SDRAM 103 can be accessed from the memory control unit 1402.

As described above, by using only the MMC interface 1407, the memory apparatus can be used not only as the MMC function but also as a high-speed volatile or nonvolatile memory.

The memory apparatus 101, 901, 1301 and 1401 of the present invention can be applied to any shapes. For example, the apparatus may be a LSI, in which memory chips and a control chip are sealed in one package, or all the functions may be housed on one semiconductor chip. The components may be housed in a memory card shape such as an MMC. Further, types of the nonvolatile memory and the volatile memory of the present invention are not limited to the flash memory 102 or the SDRAM 103. For example, regarding the nonvolatile memory, similar processing can be carried out in a ferroelectric memory or an MRAM (magnetic memory).

Figure 15:
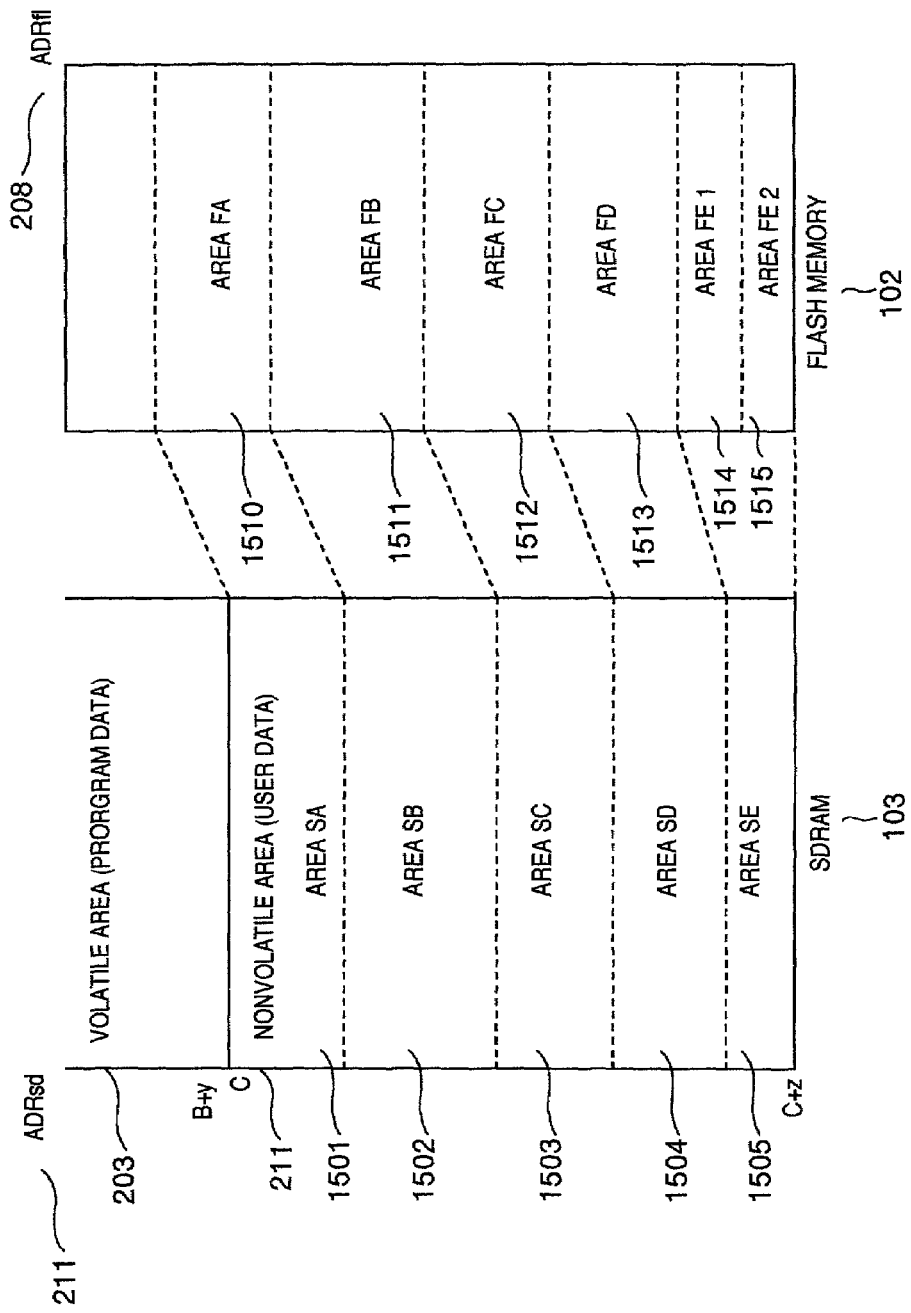
FIG. 15 is a view showing address spaces of an SDRAM and a flash memory according to the present invention.

Next, a method of managing the nonvolatile area on the SDRAM 103 according to the present invention will be described in detail. FIG. 15 shows a configuration of the nonvolatile area on the SDRAM 103, and a correlation between the nonvolatile area of the SDRAM 103 and the memory area of the flash memory 102.

As shown, the nonvolatile area of the SDRAM 103 is managed by being divided into an area SA 1501, an area SB 1502, an area SC 1503, an area SD 1504, and an area SE 1505 for purposes. The respective areas correspond to an area FA 1510, an area FB 1511, an area FC 1512, an area FD 1513, and area FE 1 (1514), and an area FE 2 (1515) on the flash memory 102. Correspondence between the areas on the SDRAM 103 and the areas on the flash memory 102 may not be one to one, and correspondence may be set among the area SE 1505, the area FE 1 (1514) and the area FE 2 (1515). The area may be divided more, and managed.

Regarding the area management, an area management table 1601 is prepared in the address mapping table 603, and the area is managed by the data transfer control unit 105 based on information thereof. The area management table 1601 may be prepared on another recorder. FIG. 16 shows a specific example of the area management table 1601. On the area management table 1601, attribute information of areas is managed from a head of the flash memory 102 when the areas are sequentially allocated. For example, if the nonvolatile area of the SDRAM has an area configuration similar to that shown in FIG. 15, attribute of each area shown in FIG. 16 is allocated to the area management table 1601. By setting attribute in each area, it is possible to set a characteristic of an access system or the like according to a condition for using the host 111.

In FIG. 16, a value p of OFFSET ADDRESS is set to a maximum value of the number of areas to be allocated. Each area, in which area information of the area management table 1601 is not saved, is used as a spare area next time area allocation is carried out. Thus, this area is managed by the data transfer control unit 105.

FIG. 17 shows an example of the area attribute information described above with reference to FIG. 16.

A head address 1702 of the SDRAM area designates a start address of the SDRAM area. A head address 1703 of a flash area designates a start address of the flash memory area corresponding to the head address 1702 of the SDRAM area. An SDRAM area size 1704 designates a size of the SDRAM area. An updating number of times 1705 records how many times data on the SDRAM 103 is updated by the host 111 after the data is transferred from the flash memory 102 to the SDRAM 103. A value is cleared to 0 when data is written from the SDRAM 103 into the flash memory 102. For a threshold value 1706 of an updating number of times, when 0 is designated, data is written in the flash memory 102 each time the SDRAM area is updated. When a value of 1 or higher is designated, no data is written in the flash memory 102 until the SDRAM area is updated by a designated number of times. For pre-erasure 1707, when 0 is designated, corresponding data on the flash memory area is not erased even if the SDRAM 103 is updated. When 1 is designated, corresponding data on the flash memory area is erased. For the number of data copies 1708, when 0 is designated, no data on the SDRAM 103 is copied. When 1 is designated, data on the SDRAM 103 is copied by a designated number, and written in the flash memory 102. The number of wear levelings 1709 is a parameter for controlling processing of wear leveling for changing a writing position each time data is written from the SDRAM 103 in the flash memory 102. When 0 is designated, no wear leveling is carried out in writing of data from the SDRAM 103 in the flash memory 102. When a value of 1 or higher is designated, wear leveling is carried out by a designated number in writing of data from the SDRAM 103 in the flash memory 102. For example, when 1 is designated, as in the case of the areas SE, FE 1 (1514) and FE 2 (1515) in FIG. 15, an area twice as large as the SDRAM area is prepared in the flash memory 102 and, when data is written from the SDRAM area SE 1505 in the flash memory 102, data are alternately written in the areas FE 1 (1514) and FE 2 (1515). A wear leveling value 1710 indicates a value necessary for calculating a next writing position while wear leveling is valid. When this value becomes equal to the number of wear levelings 1709, it is cleared to 0. A user definition attribute 1711 indicates a value of each area to be set by the host 111.

Figure 18:
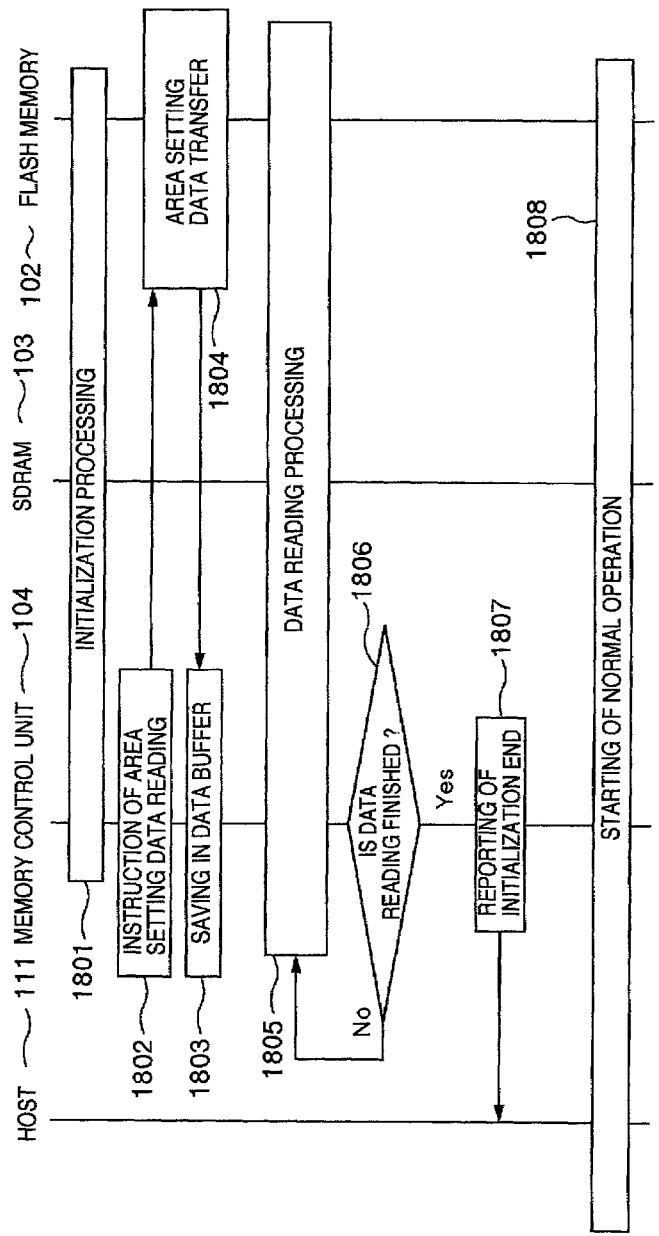
FIG. 18 is a flowchart of processing when a host and the memory apparatus are started according to the present invention.

FIG. 18 is a flowchart showing a process of area setting data setting processing and initializing processing when the memory apparatus 101 is started. When the memory apparatus 101 is started, the memory control unit 104, the SDRAM 103, and the flash memory 102 are initialized (1801). After the end of initialization, the memory control unit 104 issues an area setting data reading command to the flash memory 102 (1802). The flash memory 102 transmits the area setting data to the memory control unit 104 (1804). The memory control unit 104 saves the area setting data in the data buffer 108 (1803). Then, the memory control unit 104 instructs transfer of the initialization data from the flash memory 102 to the SDRAM 103 based on area setting information, and data is transferred (1805). Data reading processing will be detailed later. The memory apparatus 101 repeats the data reading processing until all necessary data are read (1806). After the end of the data transfer, the memory apparatus 101 reports the end of its own initialization to the host 111 (1807). Then, the host 111 and the memory apparatus 101 start normal operations (1808).

Figure 19:
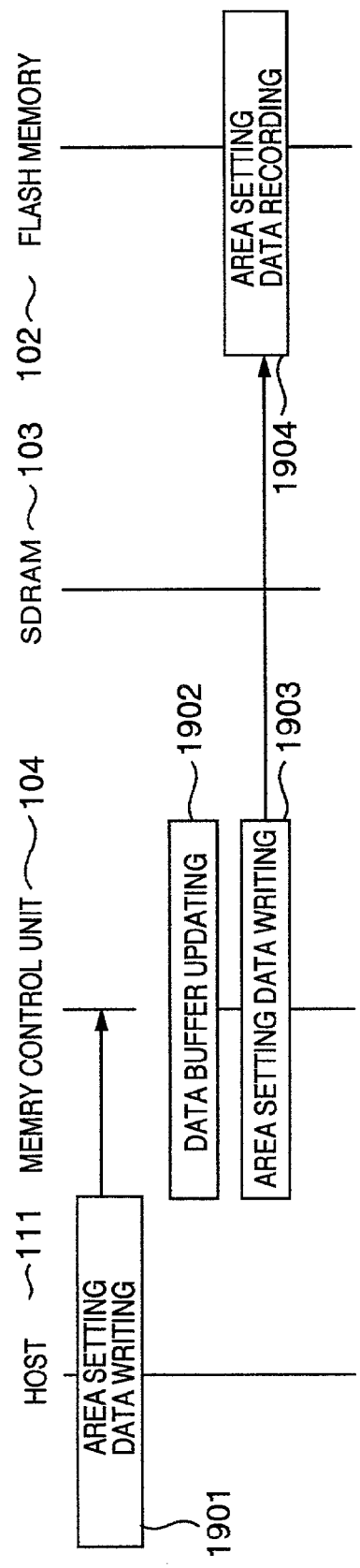
FIG. 19 is a flowchart of processing when the address space management table of the host and the memory apparatus is updated according to the present invention.

FIG. 19 is a flowchart showing a process when the host 111 updates area data. The host 111 writes area setting data in the memory apparatus 101 (1901). The memory control unit 104 writes the data in the data buffer 108, and updates the data (1902). Then, the memory control unit 104 writes the area setting data in a area setting data recording area of the flash memory 102 (1903, and 1904).

Figure 20:
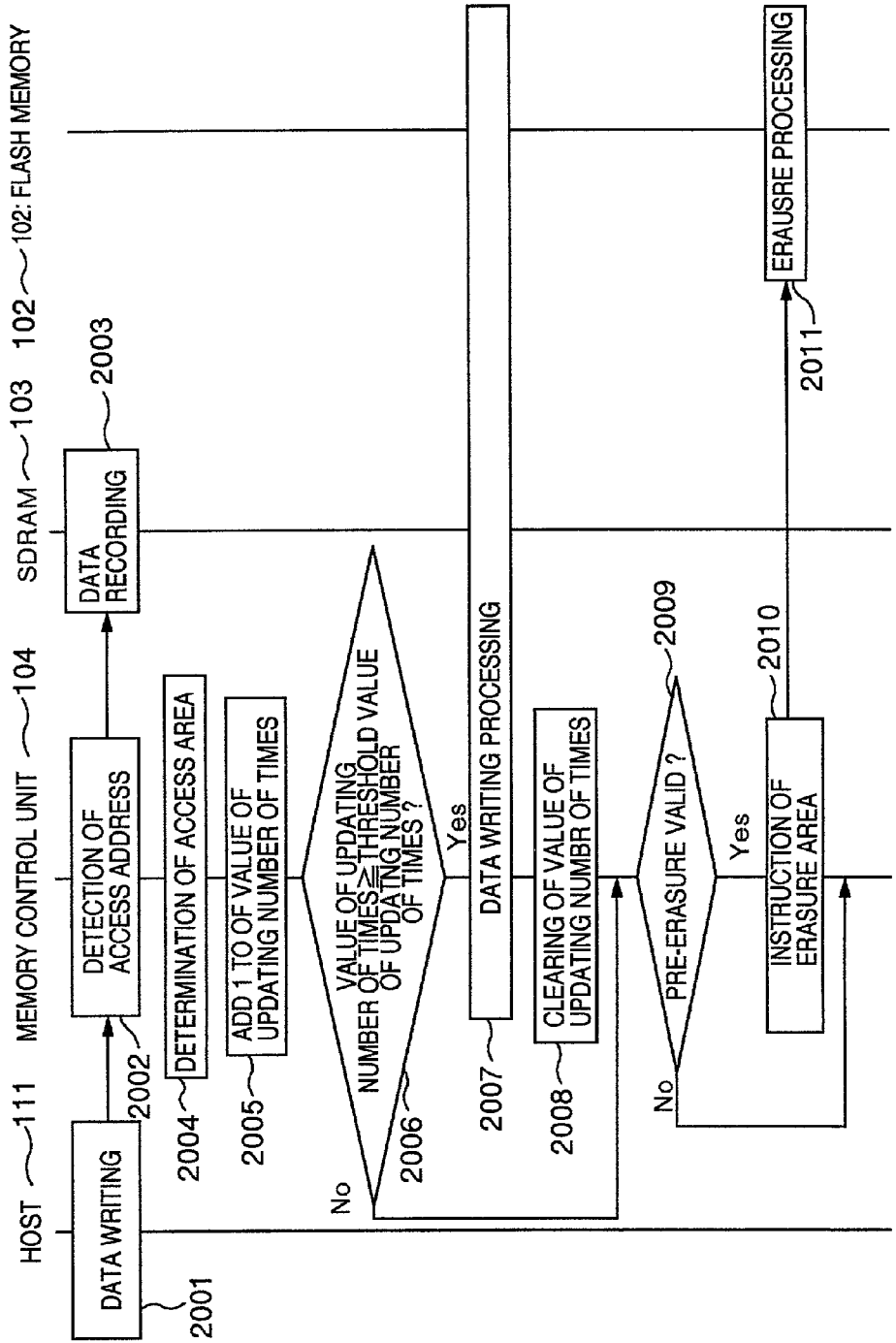
FIG. 20 is a flowchart of processing when host data is written at the host and the memory apparatus according to the present invention.

FIG. 20 is a flowchart showing a process when the host 111 writes data in the memory apparatus 101.

The host device 111 writes data in the memory apparatus 101 (2001). In this case, the memory control unit 104 detects an access address of the host 111 (2002). The data written by the host 111 is recorded in the SDRAM 103 (2003). The memory control unit 104 checks an access area of the host 111 based on the detected access address, and refers to area attribute on the area management table 1601 (2004). Then, the memory control unit 104 adds 1 to the value 1705 of the updating number of times of area attribute (2005). When the value 1705 of the updating number of times becomes equal to/higher than the threshold value 1706 of the updating number of times, the memory control unit 104 instructs execution of data writing processing (2007) from the SDRAM 103 to the flash memory 102, and then the value 1705 of the updating number of times is cleared (2008). If the value 1705 of the updating number of times is less than the threshold value 1706 of the updating number of times, the memory control unit 104 determines validity of the pre-erasure 1707 (2009). If the pre-erasure 1707 is valid, then the memory control unit 104 instructs an area to be erased to the flash memory 102 (2010). The flash memory 102 erases a designated area (2011). If the pre-erasure 1707 is invalid, then the memory control unit 104 finishes processing.

Figure 21:
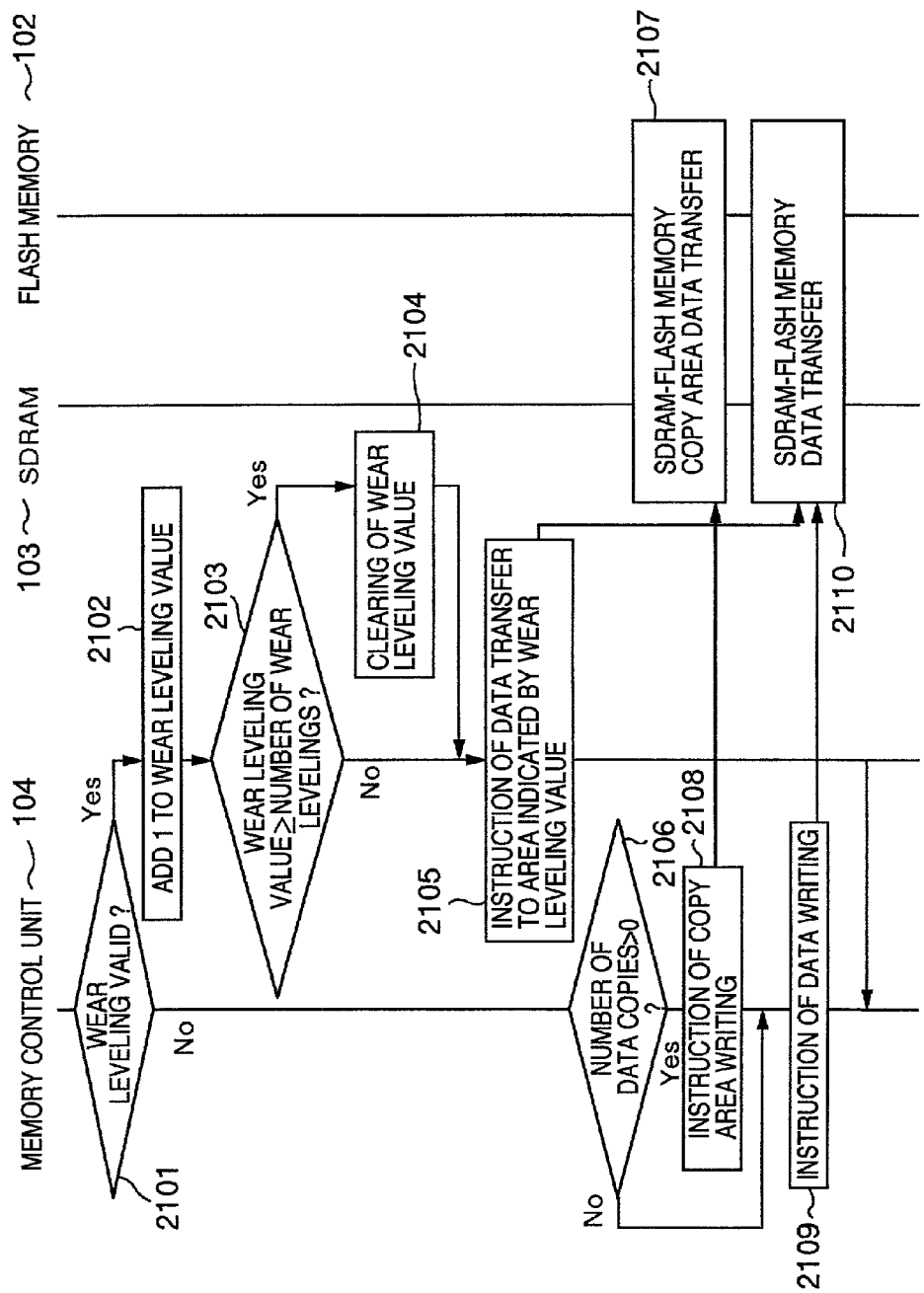
FIG. 21 is a flowchart of processing when data is written in the flash memory of the memory apparatus according to the present invention.

FIG. 21 is a flowchart showing a detailed process of the data wiring processing 2007.

The memory control unit 104 determines validity of wear leveling (2101). If valid, the memory control unit 104 adds 1 to a wear leveling value (2102). When a wear leveling value 1710 becomes equal to/higher than the number of wear levelings 1709, the memory control unit 104 clears the wear leveling value 1710 (2103, and 2104). Then, the memory control unit 104 instructs data transfer from the SDRAM 103 to the flash memory 102 in an area indicated by the wear leveling Value (2105), and the processing is finished after the end of the data transfer (2110). If the wear leveling is invalid, the memory control unit 104 determines the number of data copies (2106). If the number of copies is 1 or more, then the memory control unit 104 instructs transfer of the designated number of data copies from the SDRAM 103 to the flash memory (2108), and the SDRAM 103 and the flash memory 102 execute data transfer from the SDRAM 103 to the flash memory 102 (2107). Then, the memory control unit 104 instructs data writing in the SDRAM 103 and the flash memory 102 (2109), and the SDRM 103 and the flash memory 102 execute normal data writing (2110).

Figure 22:
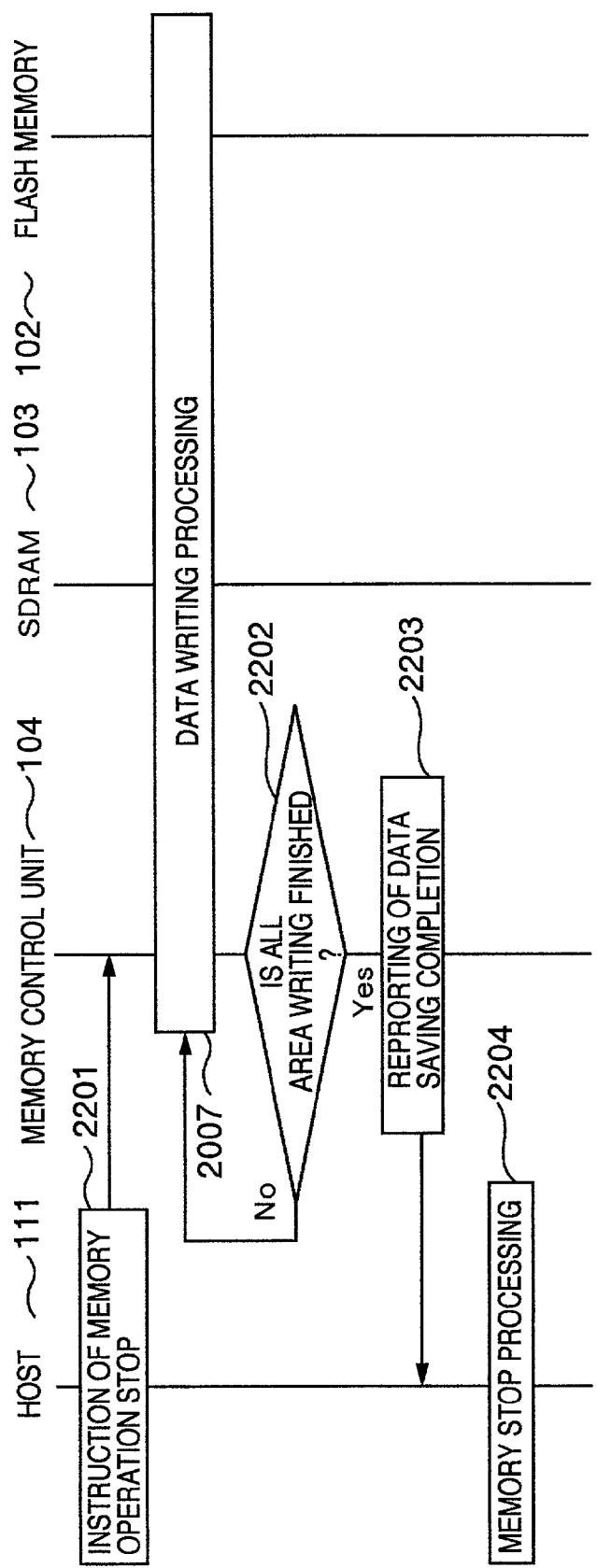
FIG. 22 is a flowchart of processing when operations of the host and the memory apparatus are finished according to the present invention.

FIG. 22 is a flowchart showing a process when an operation of the memory apparatus 101 is finished.

The host 111 issues a memory operation stop command (2201). The memory apparatus 101 writes, among unsaved data on the SDRAM 103, all the data to saved in the flash memory 102 (2007). When the data writing of all the areas to be saved on the SDRAM 103 in the flash memory 102 is finished (2202), the memory apparatus 101 issues a data saving completion report 2203 to the host 111. Then, the host 111 executes memory stop processing (2204).

Figure 23:
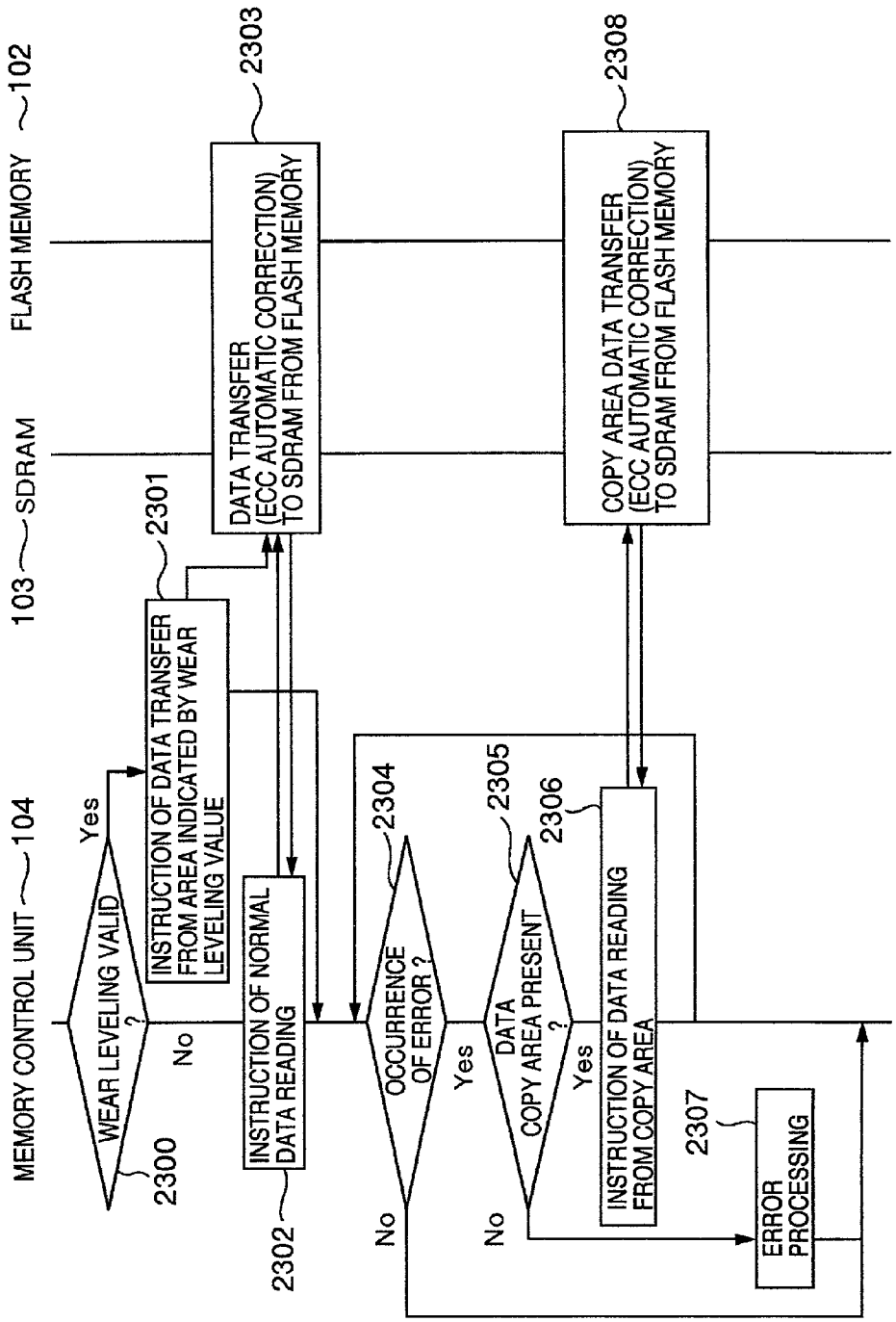
FIG. 23 is a flowchart of processing when data is read from the flash memory of the memory apparatus according to the present invention.

FIG. 23 is a flowchart showing a detailed process when data is transferred from the flash memory 102 to the SDRAM 103.

The memory control unit 104 determines wear leveling validity of an area, in which data reading is executed (2300). If wear leveling is valid, then the memory control unit 104 instructs data transfer from a flash memory area indicated by the wear leveling value 1710 to the SDRAM 103, and data is transferred (2301, and 2303). If wear leveling is invalid, then the memory control unit 104 instructs execution of normal data reading, and normal data reading is executed (2302, and 2303). During the data transfer, the ECC control circuit 109 may automatically correct an ECC error of read data. After the end of such processing, the memory control unit 104 makes error determination of data read on the SDRAM 103 (2304). If no errors are detected, the processing is finished. If an error is detected, then the memory apparatus 104 determines whether a data copying area is valid or not (2305). If valid, the memory control unit 104 instructs data reading from the copied areas to the SDRAM 103 and the flash memory 102 (2306, and 2308). Then, the memory control unit 104 makes error determination again (2304) and, if no errors are detected, the processing is finished. If an error is detected, the memory control unit 104 determines presence of copied data again (2305). The memory control unit 104 executes this processing until there are no more copied data. If errors still remain even after the disappearance of the copied data, error processing is executed (2307). As an example of error processing, the area may be processed as a failed sector by the alternative sector circuit 110, thereby preparing an alternative sector, and error occurrence may be notified to the host 111.

According to the present invention, in the memory apparatus including the volatile memory and the nonvolatile memory, the high-speed and nonvolatile memory system can be freely constructed in accordance with the host. That is, a nonvolatile area can be mapped freely in the volatile area to be accessed by the host. Data transfer can be carried out between the volatile memory and the nonvolatile memory in an optional address range, and by an optional timing. Moreover, since the volatile memory and the nonvolatile memory can be accessed by use in combination with the card interface such as an MMC, or only by the card interface, usability can be enhanced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A memory apparatus comprising:
a volatile memory having a first capacity for storing data;
a nonvolatile memory having a second capacity for storing data less than the first capacity; and
a control circuit for controlling data transfer among a host, the volatile memory and the nonvolatile memory,
wherein when the control circuit receives a command from a host, it interprets the command,
when the interpreted command is a write command, the control circuit transfers the data from the host to the volatile memory,
when the interpreted command is a read command, the control circuit transfers the data stored in the volatile memory to the host, and
when the interpreted command is a transfer command, and not either of the read or write commands, the control circuit starts a data transfer to copy a part of data from the volatile memory to the nonvolatile memory, or to copy data from the nonvolatile memory to the volatile memory.

2. A memory apparatus comprising:
a volatile memory having a first capacity for storing data;
a nonvolatile memory having a second capacity for storing data less than the first capacity;
a control circuit for controlling reading and writing of data in the volatile memory and the nonvolatile memory;
a first interface positioned between a host and the control circuit to control data transfers to/from the volatile memory; and
a second interface positioned between the host and the control circuit to control data transfers to/from the nonvolatile memory,
wherein said control circuit transfers data from the host to the volatile memory in response to a write command from the host to the first interface, transfers data stored in the volatile memory to the host in response to a read command from the host to the first interface, and starts a data transfer between said volatile memory and the nonvolatile memory in response to a transfer command from the host via the second interface, the transfer command being different from the write and read commands.

3. A memory apparatus comprising:
a volatile memory having a first capacity for storing data;
a flash memory having a second capacity for storing data less than the first capacity;
a control circuit for controlling data transfer between the volatile memory and the flash memory; and
a holding circuit for holding data to be transferred between the volatile memory and the flash memory,
wherein said control circuit transfers data from the host to the volatile memory in response to a write command from the host, transfers data from the volatile memory to the host in response to a read commend from the host, and starts the data transfer between said volatile memory and the flash memory via the holding circuit in response to a transfer command from the host, the transfer command being different from the write and read commands.

4. A memory apparatus comprising:
a volatile memory having a first capacity for storing data from a host;
a nonvolatile memory having a second capacity smaller than the first capacity and capable of storing a part of the data stored in the volatile memory, and capable of electrically deleting the data; and
a control circuit for controlling data transfer among a host, the volatile memory and the nonvolatile memory;
wherein the control circuit is coupled to receive commands from the host, and transfers data from the host to the volatile memory in response to a write command from the host, transfers data stored in the volatile memory to the host in response to a read command from the host, and copies data from the volatile memory to the nonvolatile memory in response to a transfer command from the host, the transfer command being different from the write and read commands.

5. The memory apparatus according to claim 4, further comprising a control register for storing control information used by the control circuit,
wherein the nonvolatile memory includes a control register storage area for storing the control information set in the control register.

6. The memory apparatus according to claim 4, further comprising address correspondence information for defining a relationship between an address of the volatile memory and an address of the nonvolatile memory, and
wherein the control circuit changes the relationship between the address of the volatile memory and the address of the nonvolatile memory.

7. The memory apparatus according to claim 6, wherein the control circuit changes the correspondence between the address of the volatile memory and the address of the nonvolatile memory according to a number of times one of (1) data has been deleted from the nonvolatile memory or (2) failure of the nonvolatile memory data storage area.

8. A memory apparatus according to claim 4, wherein
the control circuit includes a control register which is accessible from the host,
said volatile memory includes a first area and a second area for storing the data,
said nonvolatile memory includes a third area for mirroring of the first area of the volatile memory, the third area being capable of storing a part of data stored in the volatile memory and a fourth area for storing address correspondence information indicative of relationships between the address of the first area of the volatile memory and the address of the third area of the nonvolatile memory,
said control circuit reads out the address correspondence information from the fourth area of the nonvolatile memory to the control register, and
said control circuit controls the data transfer between the volatile memory and the nonvolatile memory in accordance with the address correspondence information in the control register.

9. The memory apparatus according to claim 4 wherein the control circuit is responsive to a power supply to transfer data stored in the nonvolatile memory to the volatile memory when power is available, and to transfer a part of the data stored in the volatile memory to the nonvolatile memory when power is interrupted.

* * * * *